Figure 1:
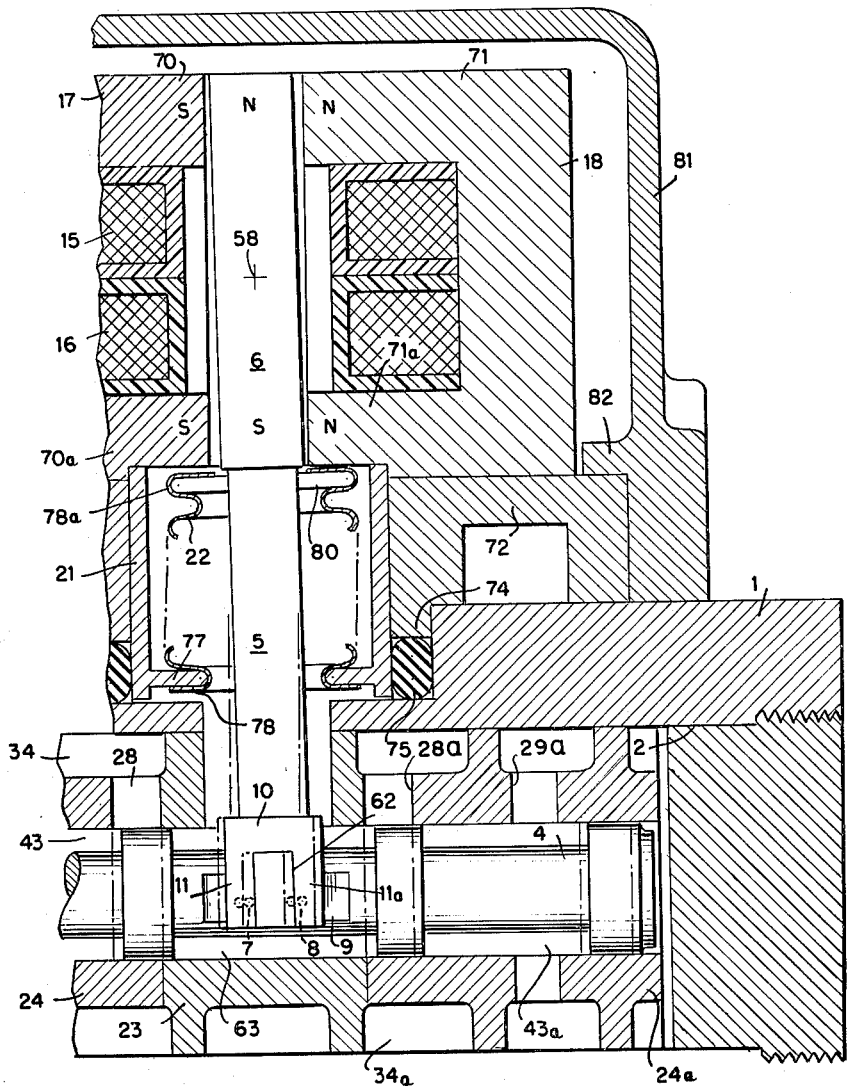

INVENTOR
Thomas J. Thomas

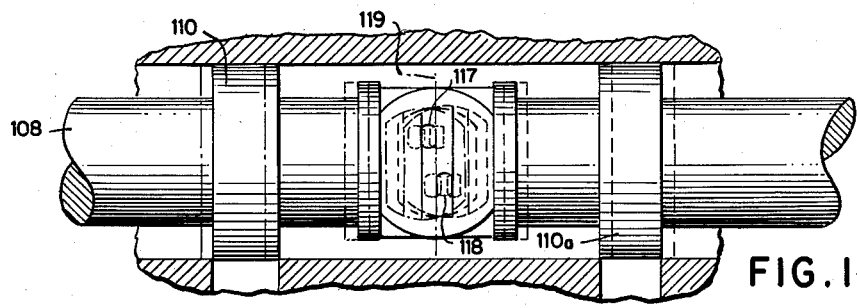
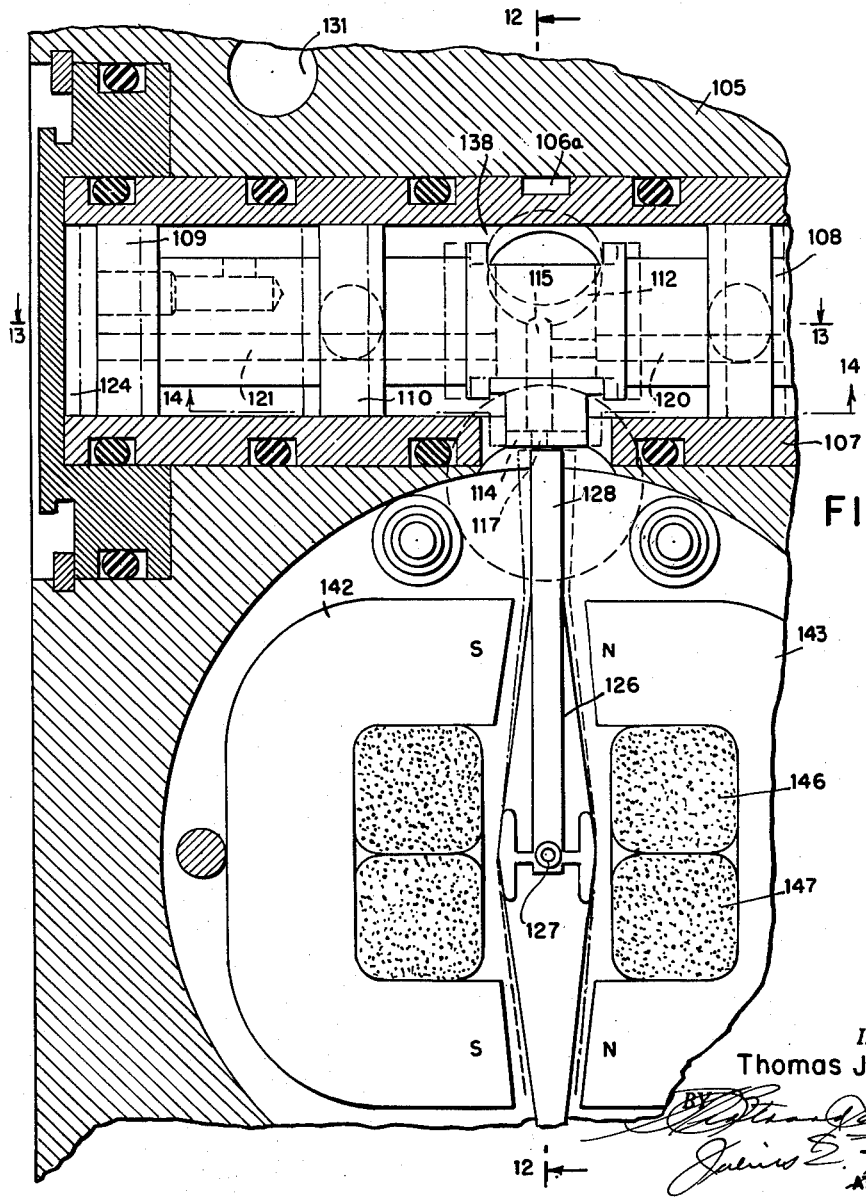
FIG.14
FIG.11
*INVENTOR.*
Thomas J. Thomas
ATTORNEYS

Oct. 10, 1961 T. J. THOMAS 3,003,476
MOTOR FLAPPER CONTROLLED HYDRAULIC SERVO VALVE
Filed Sept. 11, 1957 10 Sheets-Sheet 10

INVENTOR.
Thomas J. Thomas
BY
ATTORNEYS

# United States Patent Office 3,003,476
Patented Oct. 10, 1961

3,003,476
MOTOR FLAPPER CONTROLLED HYDRAULIC
SERVO VALVE
Thomas J. Thomas, Verona, N.J., assignor to General
Precision Inc., a corporation of Delaware
Filed Sept. 11, 1957, Ser. No. 683,292
7 Claims. (Cl. 121—46.5)

This invention relates to hydraulic control systems, and is particularly directed to a hydraulic servo-valve mechanism, such as that employed in high-pressure hydraulic aircraft control systems.

Servo-valves of this general type are frequently employed in high-speed aircraft, guided missiles and the like, where high speed and a high degree of sensitivity and accuracy of response are vital to the operation of the vehicle.

In a system of this general type, an electrical signal of relatively small magnitude is received and amplified in the hydraulic servo system so that it can be utilized for flight control or for controlling the position of various operative parts of the airplane, such as the landing gear.

In the conventional type of hydraulic servo-valve system, it is necessary for an electric motor to physically displace the valve spool, either through the full extent required or through a major portion of its travel, in order to control the flow of high pressure fluid through the valve.

This necessitates the use of a costly motor of a relatively high power, in order to physically displace the piston or spool against the high hydraulic pressure under which it operates, and under the very small clearances that are of necessity usually provided in valves of this type.

In another type of hydraulic valve system, a small electric or electro-magnetic motor is employed, a flapper attached to the pivoted armature of the motor being provided to selectively engage the end of one of a pair of open conduits in order to selectively shut off the flow of oil and control the reciprocating movement of the piston or spool therein.

As the fluid pressures employed in most aircraft hydraulic servo-systems are relatively high in order to reduce the size and weight of the unit to a minimum, any deviation or delay in co-ordination between the electrical signalling unit and the servo-metering sections results in errors in co-ordination between the electrical input signal and the valve movement.

With the pivoted flapper-controlled type of servo-valve, one or both of the conduit apertures controlled by the flapper is usually open, resulting in an almost continuous flow of fluid under relatively high pressure therefrom. In order to reduce this flow of fluid to a minimum, these apertures are usually made extremely small. With the extremely small diameter of the aperture, the tendency to clog the aperture is of necessity increased, so that even the smallest particles of solid matter present in the fluid will tend to clog the apertures, and seriously interfere with or prevent entirely the operation of the servo-valve.

While fluid filters of various types are usually provided in hydraulic systems of this type, small particles of solid material sometimes escape into the system and tend to clog the very small openings, thereby seriously interfering with the operation of the hydraulic servo-system.

As the planes and guided missiles, important parts of which are controlled by a hydraulic servo-valve, are operated at extremely high speeds, and therefore against extremely high air pressures, any errors in co-ordination between the electrical signal and the hydraulic servo system, however small, would assume vital proportions in the navigation or control of the aircraft, or in the operation of such units thereof as the landing gear. Due to the high speeds of operation and the extreme air pressures and the tremendous forces required, it is extremely difficult and in many cases almost impossible to substitute manual operation for the hydraulic control system in the event of failure of the hydraulic servo system for any reason.

The primary object of this invention is to reduce to a minimum the time lag required between the energizing of the coils of the electro-magnetic driver motor and the corresponding following movement of the spool, or piston of the hydraulic servo-valve.

Another object is to provide a hydraulic control system in which the openings in the spool which are used to control the movement thereof, are held to a diameter large enough to allow small particles of solid matter to pass through them with the fluid, thus reducing to a minimum the number of stoppages caused by clogging of the openings, while still maintaining the flow of fluid through the openings at a reasonable level.

A major feature of applicant's invention is that it relieves the armature of the driver motor of the necessity for directly moving the spool of the hydraulic control valve, thereby considerably reducing the size of the electro-magnetic driver motor required and consequently the overall size and weight of the complete unit.

Another feature of the invention is that it improves by a substantial margin the rate of response of the spool movement to the signal current supplied to the motor coils, thereby obtaining more accurate hydraulic response and overall co-ordination than is possible with conventional means.

By reducing the weight of the motor armature and eliminating any direct connection between the motor and armature and the hydraulic valve spool, the inertia forces of the combination are reduced considerably, thereby permitting extremely rapid and accurate spool response and particularly reversals of spool movement, where such reversals are necessary in the operation of the combined system.

Another feature of the invention is that due to the accurate co-ordination between the current flow to the electro-magnetic driver motor and the valve spool movement, no complex electrical compensating devices or amplifiers are necessary, thus reducing the overall weight and cost of the unit, and eliminating elaborate and costly electrical compensating devices.

By hydraulically controlling and balancing the spool, and eliminating any physical connection between the valve spool and the electro-magnetic driver motor, and by reducing the inertia of the motor armature to a minimum, it is possible to obtain extremely fast and accurate response with a larger spool, thus avoiding the necessity for multi-stage spools, multiple units, and other compensating devices.

A further object is to produce a hydraulic servo-valve of the type described, which is smaller, lighter, more compact, and more highly responsive than the conventional type of hydraulic valve unit, and which can be produced at lower cost than the conventional servo-valve mechanism.

The accompanying drawings illustrative of one embodiment of the invention, and several modifications thereof, together with the description of their construction and the method of operation, co-ordination, response and utilization thereof, will serve to clarify further objects and advantages of the invention.

Figure 2:
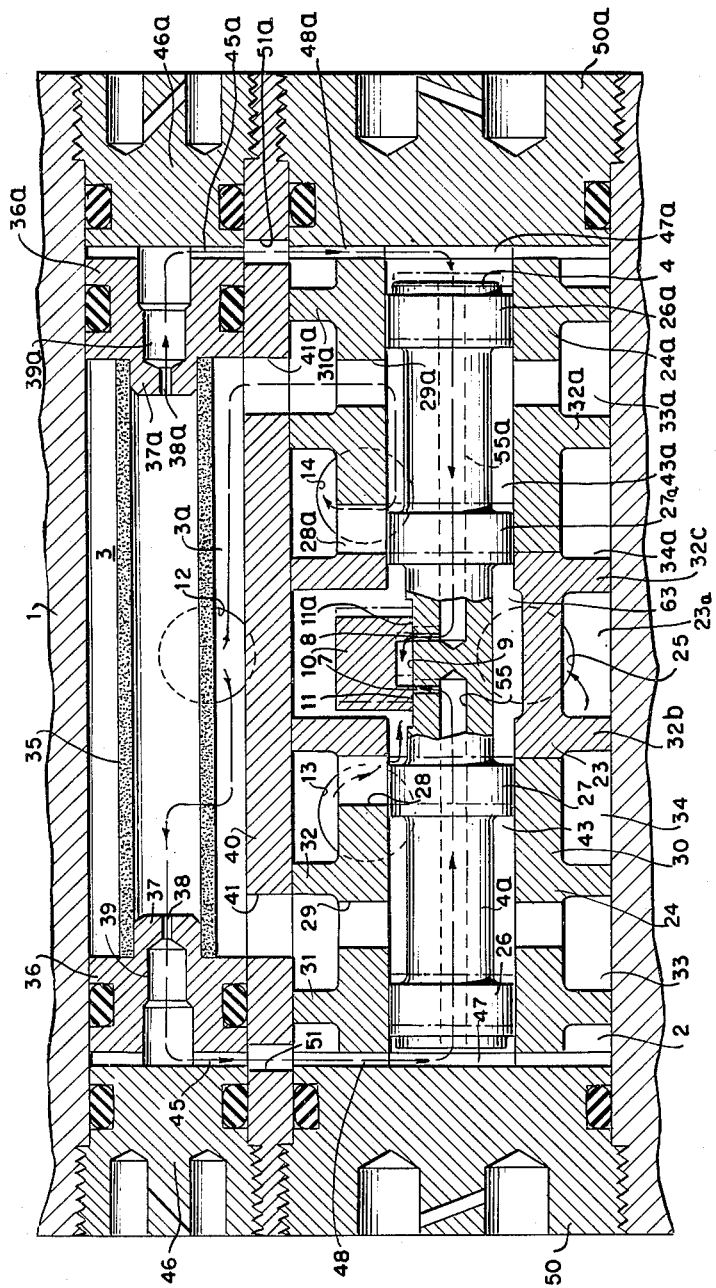
Figure 3:
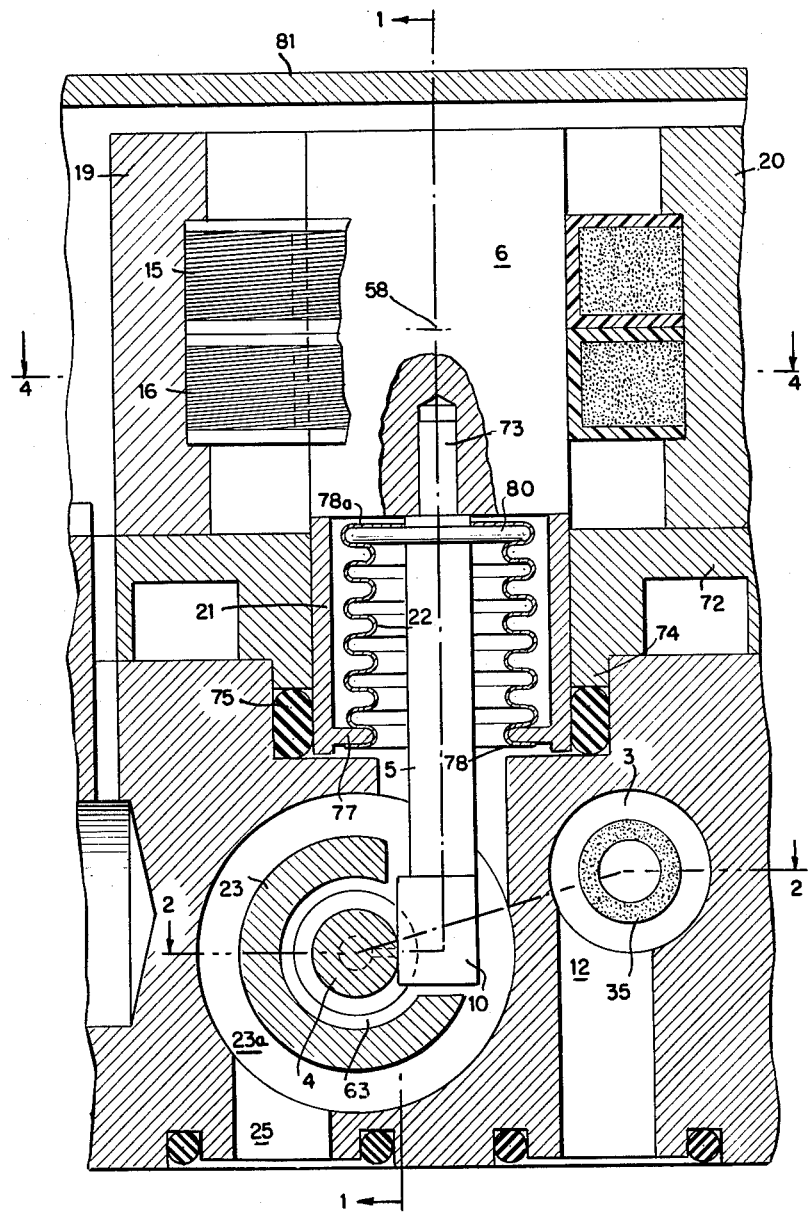

In the drawings:

FIGURE 1 represents a longitudinal section through one embodiment of the servo valve mechanism, shown in FIGURES 2 and 3, showing the spool support sleeve, the spool slidably fitted to the sleeve, the torque motor, including the transfer magnets and the armature mounted between the magnets, the flapper and the flapper head engaging the central portion of the spool, the metering openings through the central portion of the spool, and the flexible bellows seal assembly mounted between the motor and the valve mechanism to restrict the flow of fluid from the valve to the motor, the spool being shown moved to the right-hand operating position, with the flapper in the corresponding right-hand angular position, the flapper being shown in its central position in dot-dash lines, with the spool in a corresponding neutral position shown in dot-dash lines, the section being taken on the line 1—1, FIGURE 3.

FIGURE 2 is a horizontal longitudinal section through the servo valve mechanism shown in FIGURES 1 and 3, showing the tubular sleeve fitted to the housing, the spool mounted in the tubular sleeve, the head of the flapper in engagement with the flat control section of the spool, through which the metering openings pass, the auxiliary cavity parallel to the sleeve cavity, the tubular filter fitted to the auxiliary cavity, and the means for supporting the filter, also the various connecting ports through the sleeve wall and the housing wall, the various passages leading through the housing, the slotted end passages located at both ends of the tubular sleeve and the plugs supporting the tubular filter, the spool and the flapper head being shown moved to the left-hand operating position, with the spool and the flapper head shown in the central neutral position in dot-dash lines, also showing the path of the fluid from the inlet passage through the housing, around the annular filter and sleeve areas and through one outlet passage through the housing, and the path of the filtered fluid through the tubular filter, the passages through the filter support plugs, the slotted end passages in communication with the end pressure areas at the ends of the spool, through the longitudinal spool passages and the metering openings in the spool, the section being taken on the line 2—2, FIGURE 3.

FIGURE 3 is a vertical section similar to FIGURE 1, through the servo valve and motor combination showing a cross-section through the housing, sleeve and spool, also showing the armature and the flapper attached thereto, the permanent magnets located at both sides of the armature, the bellows seal assembly located between the motor and the valve mechanism, showing the head of the flapper in engagement with the flat central section of the spool.

Figure 4:
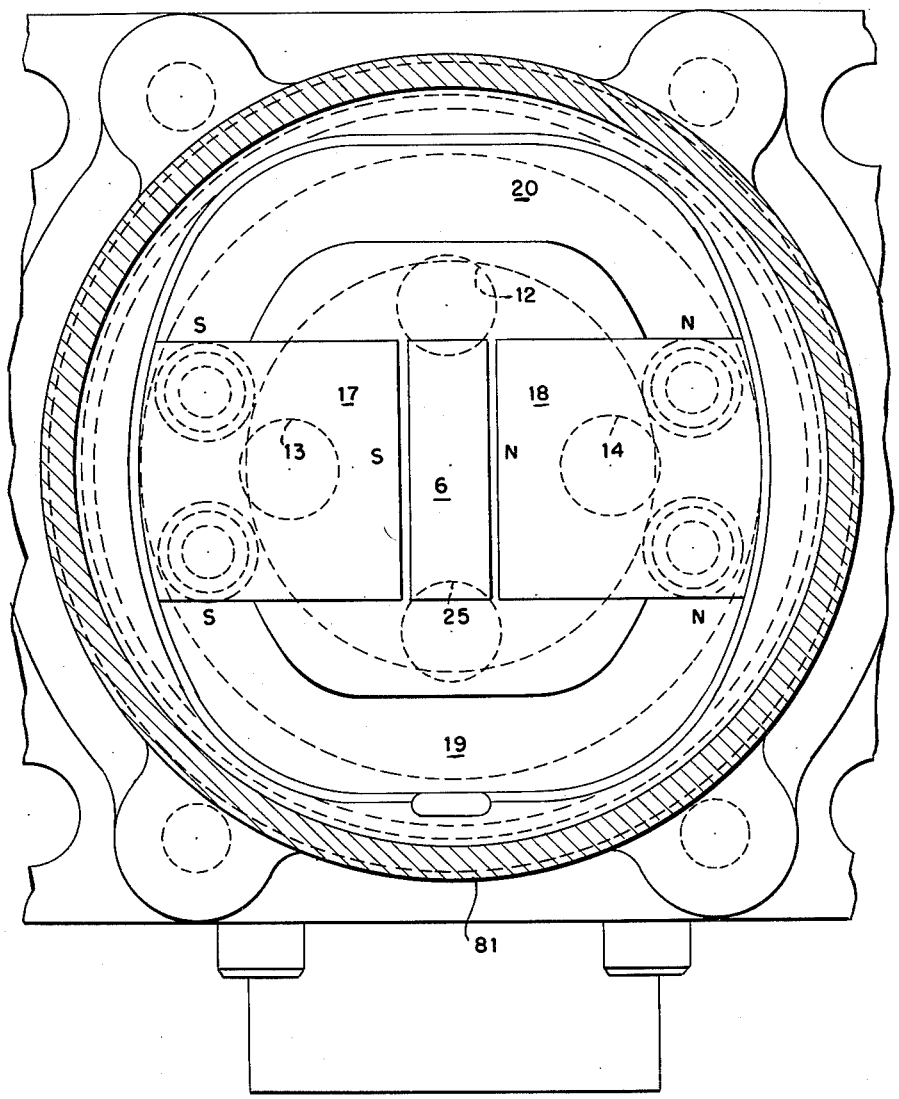

FIGURE 4 is a cross-section through the motor cover and a plan view of the torque motor shown in FIGURES 1 and 3, showing the armature, the two transfer magnets located adjacent the faces of the armature, and the two permanent magnets located adjacent the ends of the transfer magnets, showing the relation between the poles of the permanent magnets and the adjacent poles of the transfer magnets, taken on the line 4—4, FIGURE 3.

Figure 5:
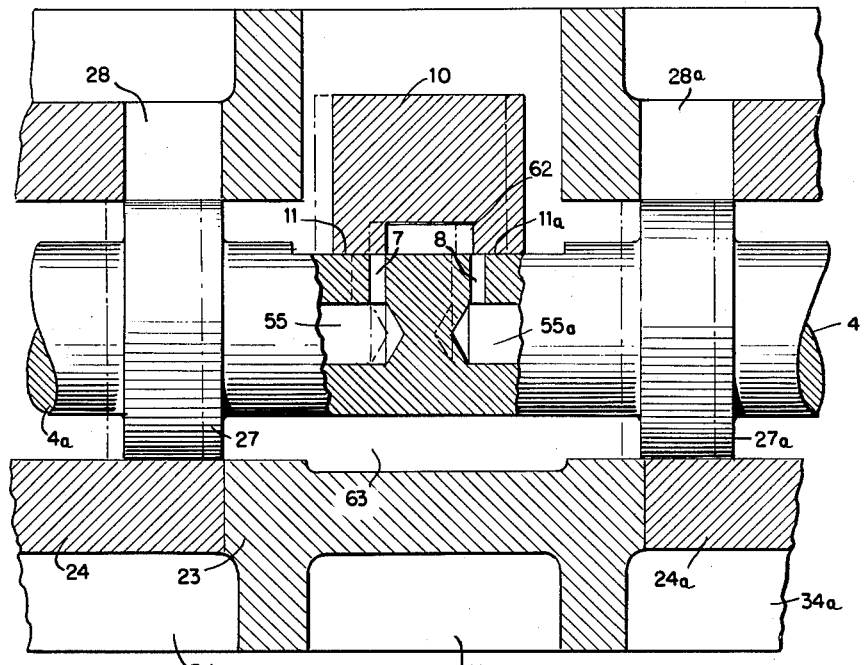

FIGURE 5 is an enlarged horizontal section through the central portion of the valve mechanism shown in FIGURE 2, showing the central portion of the spool and the sleeve to which it is fitted, also the head of the flapper with a channel cut through the lower face thereof, showing the relation between the seal areas of the head of the flapper and the metering openings through the spool when the flapper and the spool are in their neutral positions, with the spool and the flapper head shown moved to the left-hand operating position in dot-dash lines.

Figure 6:
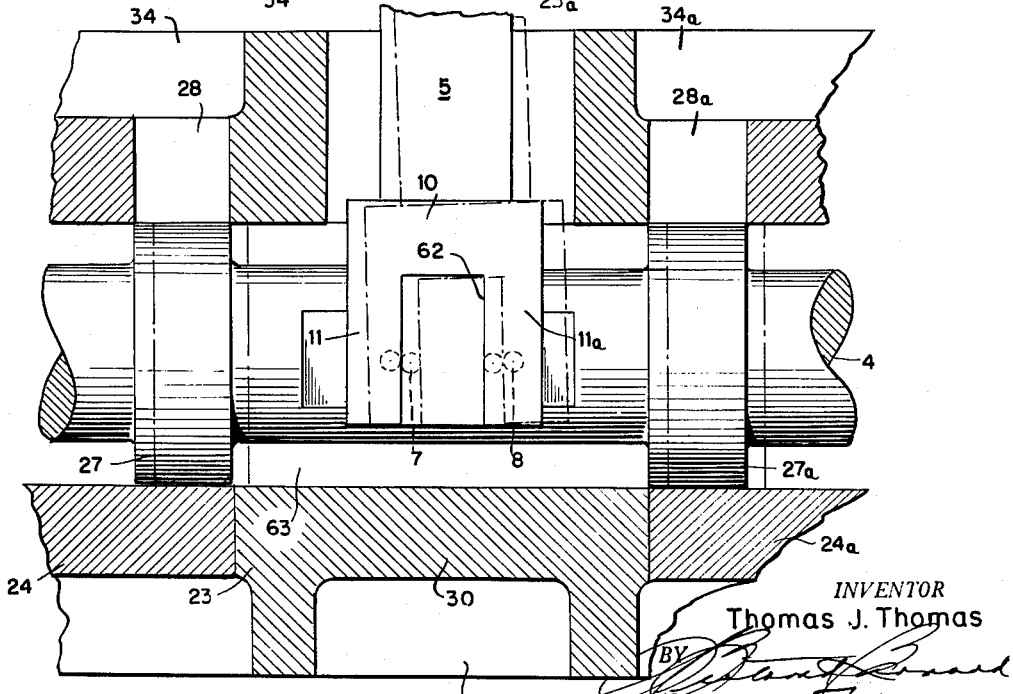

FIGURE 6 is an enlarged longitudinal section through the central portion of the servo valve mechanism shown in FIGURE 1, showing the spool in the neutral position relative to the ports in the sleeve, and the head of the flapper in the central position covering the metering openings through the center of the spool, with the central portions of the spool and the head of the flapper shown moved to the right-hand operating position in dot-dash lines.

Figure 7:
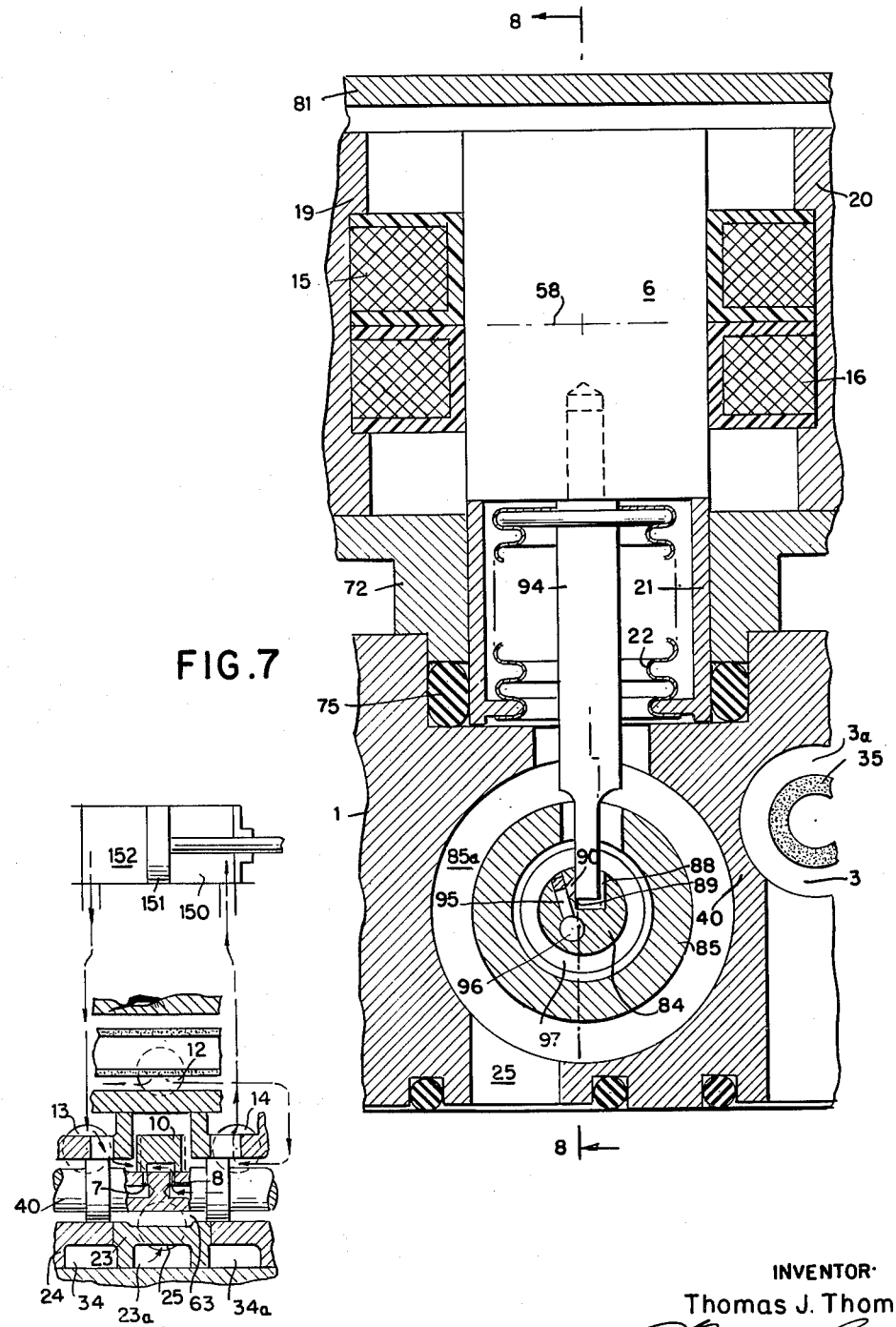
Figure 8:
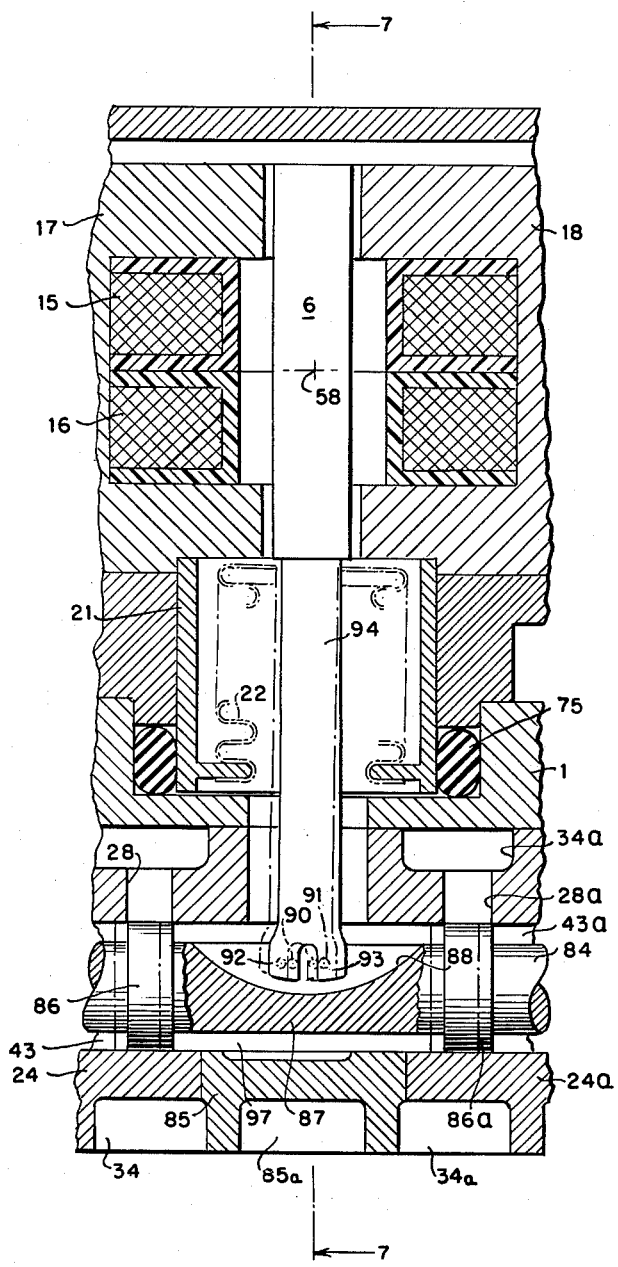

FIGURE 7 is a vertical section, similar to FIGURE 3, through a modification of the servo valve and the motor, showing a cross-section through a modification of the spool, with an open rectangular slot cut through the central portion of the spool, and a thin flapper head in engagement with one face of the slot, covering the metering openings through one wall of the spool adjacent the slot, also showing the angular passage connecting one of the longitudinal passages through the spool with one of the metering openings therein, the section being taken on the line 7—7, FIGURE 8.

FIGURE 8 is a longitudinal section, similar to FIGURE 1, through the modified servo valve shown in FIGURE 7, showing the contour of the open rectangular slot through the central portion of the spool, also the contour of the head of the flapper and the dividing slot through the center thereof, and the relation between the seal areas of the head of the flapper and the metering openings in the spool, in addition showing the flapper moved angularly leftward and the spool moved to the corresponding left-hand operating position in dot-dash lines, and the bellows seal assembly shown in a corresponding left-hand angular position, in dot-dash lines, taken on the line 8—8, FIGURE 7.

Figure 9:
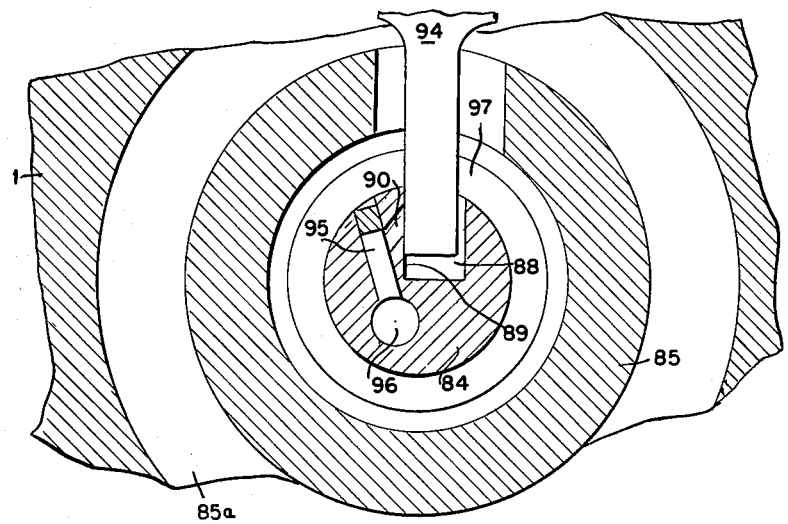

FIGURE 9 is an enlarged partial vertical section through the modified servo valve shown in FIGURE 7, showing a cross-section through the central section of the modified spool, the slot through the spool, one of the metering openings and the passage connecting the metering opening with one of the longitudinal passages through the spool, also the relation between the head of the flapper and the metering openings through the spool.

Figure 10:
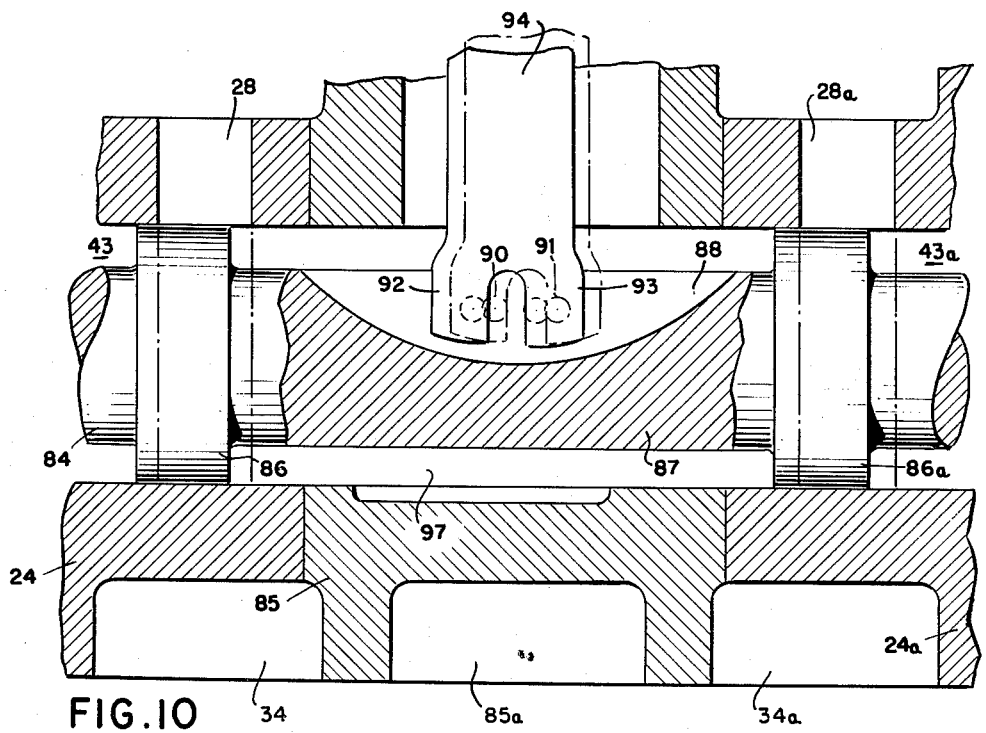

FIGURE 10 is an enlarged longitudinal section, similar to FIGURE 8, through the central portion of the modified servo valve shown in FIGURE 8, showing the flapper head moved to the left-hand angular position, and the spool moved to the corresponding left-hand operating position, with the flapper head moved to the central position and the spool in the corresponding neutral position shown in dot-dash lines.

FIGURE 11 is a longitudinal section, similar to FIGURE 1, through another modification of the servo valve mechanism shown in FIGURES 1, 2 and 3, showing a modification of the tubular sleeve and the spool fitted thereto, with an insert fitted to the central portion of the spool, the insert having a pair of metering openings therethrough, and a pair of longitudinal passages through the spool connecting the metering openings in the insert with the corresponding ends of the spool, also a modification of the torque motor having a central armature with a thin flapper of rectangular cross-section integral with the valve end of the armature, the coils surrounding the armature, and the transfer magnets mounted on opposite sides of the armature, with the flapper moved to the left-hand angular position and the spool moved to the corresponding left-hand operating position shown in dot-dash lines, and the flapper moved to the right-hand angular position and the spool moved to a corresponding right-hand operating position shown in dash lines.

Figure 12:
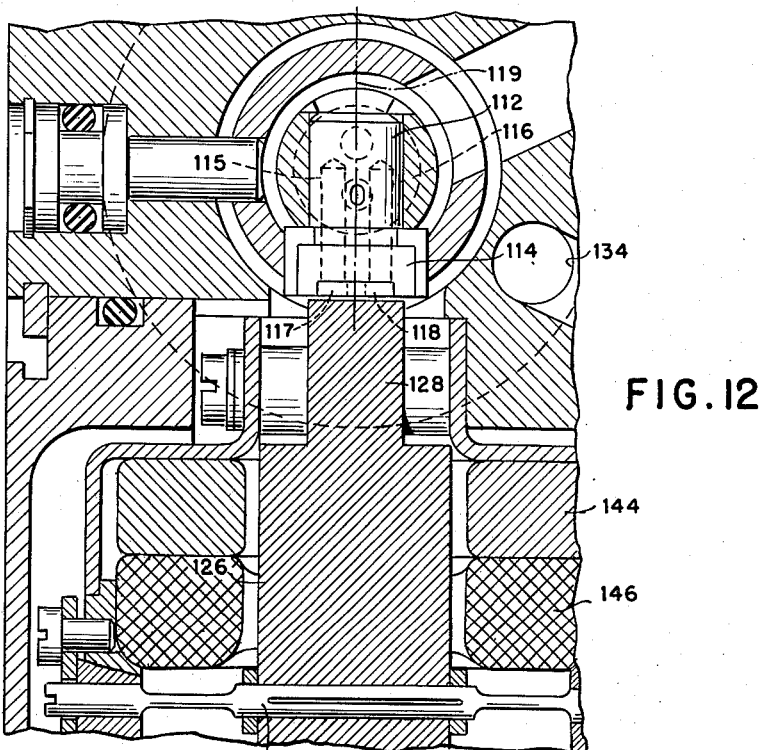

FIGURE 12 is a vertical section in a plane perpendicular to the plane through which FIGURE 11 is taken, through the modified servo valve mechanism shown in FIGURE 11, showing a cross-section through the tubular sleeve and the central section of the spool, with the insert and the insert head fitted to the central section of the spool, also showing the metering openings through the insert head and the passages connected to the metering openings through the body of the insert, also showing the modified torque motor shown in FIGURE 11, including the armature and the flapper, the coils surrounding the armature, the torsion pivot member supporting the armature and one of the permanent magnets mounted adjacent one of the coils, straddling the armature, taken on the line 12—12, FIGURE 11.

Figure 13:
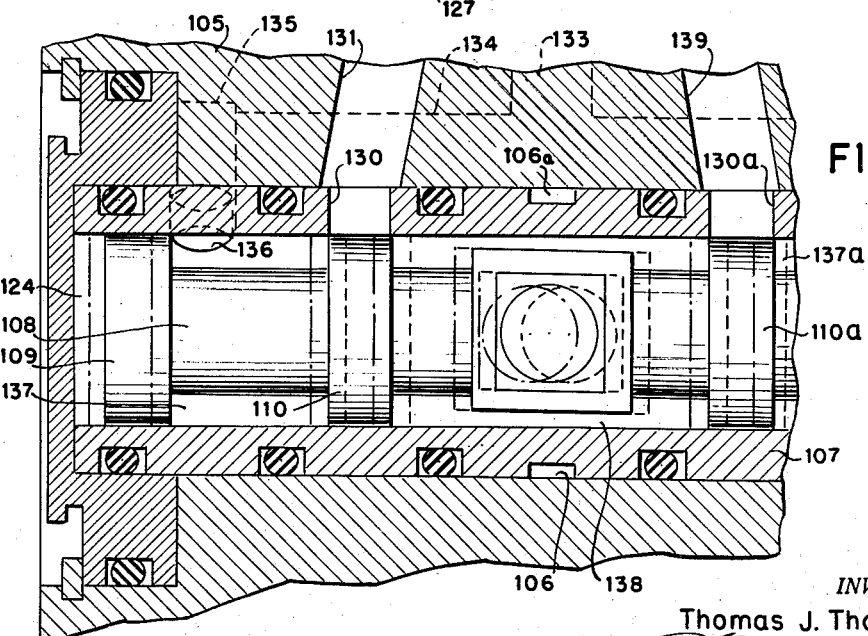

FIGURE 13 is a horizontal section in a plane perpendicular to the plane through which FIGURE 11 is taken, through the modified servo valve mechanism shown in FIGURES 11 and 12, showing the tubular sleeve and the spool fitted thereto, also the passages through the housing connected to the intermediate ports through the sleeve wall, and the passages through the housing connected to the end ports through the sleeve wall, which are in communication with the end annular areas around the spool, the spool being shown in its neutral position, also moved to the left-hand operating position in dot-dash lines, and moved to the right-hand operating position in dash lines, taken on the line 13—13, FIGURE 11.

FIGURE 14 is a horizontal section through the sleeve, and a bottom plan view of the spool shown in FIGURES 11 and 12, showing the spool in its neutral position with the flapper in its central position covering both metering openings in the spool insert, with the spool moved to its left-hand operating position and the flapper head moved to a corresponding left-hand position shown in dot-dash lines, and the spool moved to the right-hand operating position and the flapper head moved to the corresponding right-hand position shown in dash lines, taken on the line 14—14, FIGURE 11.

FIGURE 15 is a schematic longitudinal section through the central portion of the valve mechanism shown in FIGURE 2, and a schematic diagram of the remotely located hydraulic actuator cylinder, showing the path of the fluid through the valve mechanism when the spool is moved to the left-hand position, similar to that shown in FIGURE 2, the passages through the housing to which the fluid is fed to the valve mechanism and from the valve mechanism to the remotely located actuator cylinder, as well as the return flow of the fluid from the side of the actuator cylinder opposite the pressure side to the valve mechanism, the path of the fluid being indicated by arrows.

It will be understood that the following description of the construction, operation and the method of control and utilization of the hydraulic servo-valve is intended as explanatory of the invention and not restrictive thereof.

In the drawings, the same reference numerals designate the same parts throughout the various views, except where otherwise indicated.

One embodiment of the construction shown in FIGURES 1, 2 and 3, comprises a hydraulic servo-valve which is mounted in a housing 1 having a pair of longitudinal cylindrical cavities 2 and 3 including a relatively large substantially central cavity 2, and a smaller auxiliary cavity 3 substantially parallel to the central cavity, with a cylindrical spool 4 slidably fitted to a tubular sleeve mounted in the central cavity.

A flapper 5 attached to the valve end of an armature 6 which is controlled by and forms part of a torque motor which is mounted above the valve housing, the armature being pivotally supported by the torque motor, is provided to control the longitudinal movement of the valve spool 4.

The spool 4 has a pair of metering openings 7 and 8 cut through a flat face 9 thereof, on opposite sides of the cross center of the spool, the head 10 of the flapper, which is divided into two seal areas 11 and 11-a by a rectangular channel through the lower central section of the flapper head to normally seal the two metering openings, the angular movement of the flapper into the right-hand position shown in FIGURE 1, or the left-hand position shown in FIGURE 2, being operative to uncover one of the metering openings 7 or 8 in the spool, thereby controlling the longitudinal movement of the spool in the directions shown in FIGURES 1 and 2, in a manner hereinafter described in greater detail.

The movement of the spool controls the movement of fluid under pressure which is received from an external source through a passage 12 through the housing, thence through various passages through and around the sleeve in which the spool is fitted, and around the spool, the fluid under pressure being selectively transmitted through one of a pair of passages 13 and 14 through the housing, to the corresponding side of a piston 151 mounted in an actuator cylinder of an externally mounted hydraulic actuator system, such as that shown schematically in FIGURE 15.

The detailed operation of the flapper and the spool controlled thereby will hereinafter be described in greater detail.

The angular movement of the flapper 5 and the armature 6 to which it is attached, is controlled by a differential current sent through one of a pair of coils 15 and 16 mounted around the armature in the center of a pair of transfer magnets 17 and 18 mounted on opposite sides of the armature, the poles of the transfer magnets being magnetized by a pair of permanent magnets 19 and 20 of arcuate contour mounted at both sides of the transfer magnets 17 and 18, as shown in FIGURE 4.

The detailed construction and the method of operation of the torque motor which controls the angular movement of the flapper will hereinafter be described in greater detail.

In order to prevent the flow of fluid from the valve housing to the torque motor, a tubular sleeve 21 is fitted to the valve housing, around the flapper 5, a tubular bellows 22, one end of which is attached to the tubular sleeve 21, with the opposite end thereof attached to the flapper 5 in a manner hereinafter described, being provided to seal the torque motor and prevent the movement of the fluid from the valve mechanism to the torque motor.

The detailed construction of the servo-valve mechanism shown in FIGURES 1, 2 and 3, is as follows:

The servo-valve construction embodiment shown in FIGURES 1, 2 and 3 is supported by a valve housing 1 made of aluminum or other similar material, the housing having a central cylindrical cavity 2 therethrough, into which a tubular spool support sleeve is fitted.

The tubular sleeve may be made in a plurality of longitudinally aligned sections, including a central section 23 and two end sections 24 and 24-a, as shown in FIGURE 2.

As shown in FIGURES 1, 2 and 15, the housing has a plurality of cylindrical passages 12, 13, 14 and 25 therethrough, the passages being substantially perpendicular to the axis of the cavities 2 and 3 through the housing. The passages 12, 13, 14 and 25 are connected to external portions of the overall hydraulic system in a manner shown schematically in FIGURE 15, and hereinafter described in greater detail.

A substantially cylindrical spool 4, having a series of cylindrical lands 26 and 27 integral therewith, the diameter of the lands being considerably larger than that of the body of the spool to provide a series of annular areas between the lands, the diameter of which is slightly less than the inner diameter of the sleeve sections, is slidably mounted within the sleeve.

The length of the lands 26 and 27 of the spool which are of considerably greater diameter than the body 4-a of the spool is equal to the longitudinal length of each of a plurality of fluid inlet and outlet ports 28 and 29 cut through the wall of the inner cylindrical body 30 of each of the end sleeve sections, the ports 28 and 29 being sealed by the lands of the spool when the spool is in its neutral position shown by dot-dash lines, FIGURE 2.

The valve housing 1 has a smaller auxiliary cylindrical cavity 3 therethrough, the auxiliary cavity being located at one side of and substantially parallel to the housing sleeve cavity 2, as shown in FIGURE 2.

The spool sleeve sections 23, 24 and 24–a each have a plurality of cylindrical lands 31 and 32, 32–a, 32–b and 32–c integral therewith, the diameter of the lands which is greater than that of the tubular body 30 of the sleeve sections, being accurately fitted to the central cylindrical cavity 2 through the housing.

The outer annular areas 33, 34, 33–a and 34–a between the lands 31 and 32 and 32–a, 32–b, 32–c of the sleeve sections and the body 30 thereof, serve as passage areas through which fluid under pressure is fed to the sleeve ports, and directed through the inner central passage through the sleeve sections in a manner hereinafter described in greater detail.

In the same manner a central annular area 23–a is formed between the lands 32–b, 32–c of the central sleeve section 23, as shown in FIGURES 2, 3 and 15, the central annular area serving as a drain area, through which fluid from the metering openings 7 and 8 is fed through the drain passage 25 through the housing to an externally mounted drain line or storage container in the manner shown in FIGURES 2, 3 and 15, and hereinafter described in greater detail.

The small auxiliary cavity 3 through the housing has a tubular powdered metal, or other type of filter 35 mounted in the center thereof, the tubular filter being supported by a pair of cylindrical plugs 36, 36–a accurately fitted to the ends of the auxiliary cavity 3, beyond the ends of the filter tube 35, each of the plugs 36, 36–a having a pilot 37, 37–a of a diameter substantially equal to the inner diameter of the tubular filter 35 thereon, the pilots 37 and 37–a being pressed into, or otherwise accurately fitted to the inner diameter of the ends of the tubular filter 35 in order to support the tubular filter within the smaller auxiliary cavity 3. Each of the cylindrical plugs has a small longitudinal metering passage 38 and 38–a through the longitudinal center thereof, the metering passage being in direct communication and co-axial with a larger longitudinal passage 39 and 39–a through the center of each plug, through which filtered fluid from the interior of the tubular filter is fed through the passages through the spool 4 in a manner hereinafter described in greater detail.

The wall 40 between the smaller auxiliary cavity 3 and the central cavity 2 through the housing, has a pair of passages 41 and 41–a therethrough, fluid from the annular area 3–a surrounding the tubular filter being fed through the passages 41 and 41–a to the end annular areas 33, 33–a around the tubular sleeve, whence it is fed through the ports 29 and 29–a, through the bodies of the sleeve sections 24 and 24–a, to the end annular areas 43, 43–a in the central opening through the sleeve surrounding the body of the spool 4, between the lands 26, 27 thereof.

With the spool in its neutral or closed position shown in dot-dash lines, FIGURE 2, fluid is fed from the upper pressure passage 12 through the housing to the annular space 3–a surrounding the tubular filter 35, thence through the openings 41, 41–a and 29, 29–a through the housing 1 and the sleeve sections 24, 24–a respectively, to the end annular areas 43, 43–a surrounding the spool body, between the lands 26 and 27. While the spool is in this neutral position, there is no connection to any of the inlet or outlet passages through the housing, therefore the fluid pressure builds up until the line pressure is reached, after which there is no further fluid movement until the spool is longitudinally moved in a manner hereinafter described.

When the spool 4 is moved to the left to the position shown in FIGURE 2, the right-hand center land 27–a of the spool partially clears the port 28–a through the body 30 of the sleeve section 24–a, thereby allowing pressure fluid which enters the end annular area 43–a around the spool body, and passes through the openings 41–a and 29–a through the housing wall and the sleeve body sections respectively, in the manner hereinafter described, to pass through the port 28–a through the body of the side sleeve section 24–a to the intermediate annular area 34–a surrounding the body of the sleeve section, whence it passes to the pressure or right-hand side 150 of the actuator cylinder, through the right-hand passage 14 through the housing, as shown schematically in FIGURE 15.

The fluid passing through the tubular filter 35 to the central passage therethrough from the annular space 3–a surrounding the filter, passes through the small central metering passages 38, 38–a through the plug pilots 37, 37–a, thence through the larger central passages 39, 39–a through the plug pilots, whence it is discharged through a series of radially positioned slotted passages 45, 45–a between the outer surface of each plug 36, 36–a and the mating seal plug 46, 46–a threadably fitted to an extension of the auxiliary cavity 3 at each end of the housing, as shown in FIGURE 2.

These slotted passages are each directly connected to a pressure area 47, 47–a located at each end of the spool 4, through a series of radially positioned slotted passages 48, 48–a, located at each outer end of the end sleeve sections 24, 24–a between the outer ends of each of the end sleeve sections 24, 24–a and the mating inner edge of a cylindrical plug 50, 50–a located at each end of the central cavity 2 and threadably fitted thereto, the slotted areas 48 and 48–a being connected to the slotted areas 45, 45–a at the ends of the auxiliary cavity 3 by means of a plurality of openings 51, 51–a through the housing wall 40, between the auxiliary and central cavities 3 and 2.

The cylindrical pressure areas 47, 47–a at both ends of the spool 4 are therefore both filled with fluid under pressure fed from the interior of the tubular filter 35 in the manner hereinbefore described, the pressure in both pressure areas 47, 47–a being substantially equal, thereby maintaining the spool in a static position when the spool is in the neutral position shown by dot-dash lines, FIGURE 2, or when the metering openings 7, 8 located adjacent the cross center of the spool and passing through a substantially flat section 9 at the center of the spool are closed in a manner hereinafter described in greater detail.

As shown in FIGURES 1, 2 and 3, the spool has a pair of small circular metering openings 7, 8 substantially equidistant from the cross centerline of the spool, each of the metering openings being connected to the pressure area 47, 47–a at the corresponding end of the spool by a longitudinal circular passage 55, 55–a through the spool as shown in FIGURE 2.

As shown in FIGURES 1 and 3, an armature 6 is mounted between the poles of the transfer magnets 17, 18 of a permanent magnet actuated torque motor mounted above the valve housing 1, in the manner shown in FIGURE 1 and hereinafter described in greater detail, the armature being pivoted about approximately the pivot center 58 thereof shown in FIGURES 1 and 3.

A flapper 5 is attached to the valve end of the armature 6 between the end of the armature and the flat central section of the spool 4, the flapper having a head 10 integral with the end thereof or attached thereto, the head engaging the flat surface 9 of the central section of the spool, the head having a central channel therethrough, which divides the head surface in engagement with the flat central section of the spool into two seal areas 11, 11–a, located on opposite sides of the longitudinal axis of the flapper head.

When the armature is held in its neutral position shown by dot-dash lines, FIGURES 1 and 3, the two seal areas 11, 11–a of the flapper head cover the respective metering openings 7, 8 through the spool, thereby sealing the metering openings and preventing any flow of fluid therethrough, the spool being thus maintained in its neutral position, shown by dot-dash lines, FIGURE 2.

When the flapper is moved to the right to the position shown in FIGURE 1, and in greater detail in FIGURE 6, by the action of the torque motor in a manner hereinafter described, the corresponding edge 62 of one seal area, adjacent the rectangular channel through the center of the flapper head, uncovers entirely or partially the right-hand metering opening, thereby allowing the fluid under pressure to escape from the right-hand pressure area 47–a at the end of the spool, to the central annular area 63 around the central section of the spool body, whence it is discharged through the lower passage 25 through the housing to the drain line of the system.

As the fluid pressures in the pressure areas 47 and 47–a at both ends of the spool are substantially equal, the uncovering, or partial uncovering of the right-hand metering opening 8 in the spool allows some of the fluid from the right-hand pressure area 47–a to pass through the longitudinal passage 55–a through the spool, through the right-hand metering opening 8 thereof, thence through the lower drain passage 25 to the drain line of the system.

This reduces the fluid pressure in the right-hand pressure area 47–a, and as the pressure in the left-hand pressure area 47 at the left-hand end of the spool is substantially constant, causes a pressure differential between the left and right-hand pressure areas, which forces the spool longitudinally rightward along the longitudinal central opening in the sleeve to substantially the position shown in FIGURES 1 and 6.

In this position, the seal areas 11 and 11–a of the head 10 of the flapper again cover the two metering openings 7 and 8 thus shutting off the flow of fluid through the right-hand metering opening, and thereby allowing the pressures in the right-hand and left-hand pressure areas to be equalized and in that manner stablizing the position of the spool until the flapper 5 is again angularly moved.

When the head 10 of the flapper is moved leftward to the position shown in FIGURES 2 and 5, the action of the seal areas of the flapper head relative to the metering openings 7 and 8 through the spool, is substantially the same as those shown in FIGURES 1 and 6 and hereinbefore described, thus again establishing fluid pressure equilibrium between the left and right-hand pressure areas at the ends of the spool and retaining the spool in the position shown in FIGURE 2 until the flapper is again angularly moved.

When the spool is moved to the left to the position shown in FIGURES 2 and 5, fluid from the upper inlet passage 12 through the housing passes through the annular space 3–a surrounding the tubular filter 35, thence through the ports 41–a and 29–a through the housing wall and the end sleeve body section respectively, through the right-hand annular space 43–a surrounding the body of the spool, thence through the partially uncovered opening 28–a through the sleeve body section, through the intermediate annular space 34–a surrounding the body of the sleeve section, and out through the right-hand passage 14 through the housing, which under these conditions may be connected to the right-hand pressure end 150 of an actuator cylinder, such as that shown schematically in FIGURE 15, or any other point at which fluid under pressure is required to perform a specific function in the overall hydraulic system. The path of the fluid under pressure from the inlet passage 12 to the right-hand pressure outlet passage 14 under the above conditions is shown in FIGURES 2 and 15 by arrows.

While the spool is in this position shown in FIGURE 2, fluid in the central annular area 63 around the central portion of the body of the spool, which accumulates from the uncovered metering opening 7 or 8 through the spool, passes through a cutout section of the sleeve body to the outer annular area 23–a surrounding the central sleeve section 23, whence it is discharged through the lower drain passage 25 through the housing, which is directly connected to the outer central annular area 23–a in the manner shown in FIGURE 3, the fluid passing to an externally mounted drain or storage container of the system.

At same time, fluid from the drain side 152 of the externally mounted actuator cylinder, which is shown schematically in FIGURE 15, passes through the left-hand cylindrical passage 13 through the housing, which under these conditions is connected to the drain side 152 of the actuator cylinder, from which it passes through the left-hand port 28 through the sleeve, through which it enters the central annular area 63 between the central spool lands, from which it enters the outer central annular area 23–a surrounding the central section 23 of the sleeve, whence it is discharged through the drain passage 25 through the housing, in the manner hereinbefore described.

When the spool is moved to the right to the position shown in FIGURES 1 and 6, the unfiltered fluid from the left-hand annular area 43 around the spool, which comes from the inlet passage 12, through the ports 41 and 29 through the housing wall and the sleeve body respectively, passes through the partially uncovered port 28 through the sleeve body section, through the intermediate annular space 34 surrounding the body of the sleeve section and out through the left-hand passage 13 through the housing, which under these conditions may be connected to the left-hand pressure side 152 of an actuator cylinder, such as that shown schematically in FIGURE 15, or any other pressure point in the system which functions in a direction opposite that to which the right-hand passage 14 is connected under the conditions previously described.

While the spool is in this position, shown in FIGURES 1 and 6, the fluid in the central annular area 63 around the spool body which accumulates from the uncovered metering opening 7 or 8 through the body of the spool, passes through the outer central annular area 23–a surrounding the central spool section, whence it is discharged through the lower drain passage 25 through the housing, to the drain line of the system, in substantially the same manner as that shown in FIGURES 2 and 15, in which the spool is moved leftward, as hereinbefore described.

At the same time, fluid from the drain side 150 of the actuator cylinder passes through the right-hand cylindrical passage 14, which is connected thereto under these conditions, from which the fluid enters the central annular area 63 surrounding the spool body, through the right-hand sleeve port 28–a, after which it passes to the central outer annular area 23–a, surrounding the central sleeve section, whence it is discharged through the drain passage 25 through the housing in the manner hereinbefore described.

In the schematic diagram shown in FIGURE 15, the valve structure is essentially the same as that shown in FIGURE 2, the spool having been moved leftward to the position shown in FIGURE 2.

In this position, the fluid which is received from the inlet passage 12 through the housing, passes through the port 28–a through the sleeve, through the right-hand housing passage 14 shown in FIGURES 2 and 15, from which it enters the right-hand pressure area 150 of the actuator cylinder, the fluid forcing the piston 151 of the actuator cylinder leftward from the neutral position shown in FIGURE 15, the piston rod attached to the piston being moved left-ward to perform the specific function for which it is utilized.

While fluid under pressure is fed into the right-hand side of the cylinder, the piston 151 in moving leftward forces the fluid in the left-hand area 152 of the actuator cylinder outward, through the left-hand passage 13 through the housing, from which it passes through the left-hand sleeve port 28 into the central annular area 63 surrounding the spool, from which it passes through the central outer annular area 23–a surrounding the central sleeve section, through the drain passage 25 through the housing, which is shown in FIGURES 3 and 15, from which it passes to a storage reservoir (not shown) or any other suitable storage means.

When the spool is moved to the right, in the manner hereinbefore described, the flow of fluid from the valve to the actuator cylinder, and from the discharge side of the actuator cylinder back to the valve mechanism, is substantially the same as that shown in FIGURE 15 and hereinbefore described, except that the flow of fluid under pressure is through the left-hand passage 13, through the valve housing, into the left-hand area 152 of the actuator cylinder, thereby forcing the piston 151 rightward from the position shown in FIGURE 15, the fluid discharged from the right-hand area 150 of the cylinder being returned to the valve mechanism through the right-hand passage 14 through the housing, thence through the right-hand port 28–a through the sleeve, through the central annular area 63 surrounding the spool, and the outer annular area 23–a surrounding the sleeve body, from which it is discharged through the drain passage 25 through the housing in the same manner as that shown in FIGURE 15 and hereinbefore described.

The torque motor shown in FIGURES 1, 3 and 4, comprises a pair of U-shaped permanent magnets 19 and 20, the poles of which abut the sides of a pair of transfer magnets 17 and 18 of rectangular channel cross-section, the poles of which are located on opposite sides of the flapper armature 6.

The two permanent magnets 19 and 20 are so located that like poles of each magnet are located adjacent the same transfer magnet 17 or 18, so that the poles of each transfer magnet, located on each side of the armature 6, are of the same polarity, as shown in FIGURE 1.

The two permanent magnets 19 and 20 are made of Alnico, or other type of permanent magnet material, the two transfer magnets being made of a highly magnetizable material, so that the transfer of magnet flux from the poles of the two permanent magnets located adjacent thereto is effected with a minimum of loss.

In the construction shown in FIGURES 1 and 4, the transfer magnets on opposite sides of the armature are of opposite polarity, relative to one another, as indicated in FIGURE 1.

A pair of coils 15, 16 wound of fine wire is fitted around the armature between the legs or poles 70, 70–a, 71, 71–a, of the transfer magnets shown in FIGURE 1.

A spacer 72 is located between one edge of the transfer magnets 17 and 18 and the valve housing 1, the spacer 72 being fixedly attached to the transfer magnet and the housing 1, respectively, in order to attach the motor to the housing.

As shown in FIGURE 3, the end of the flapper 5 which is attached to the armature 6, has a cylindrical extension 73 of a diameter smaller than that of the flapper integral therewith, the cylindrical extension being pressed into, or otherwise attached to the armature.

The end of the spacer 72 which abuts the valve housing 1, has a cylindrical pilot 74 integral therewith, the pilot fitting into a cylindrical cavity in the end of the housing, FIGURE 3. A packing ring 75 made of rubber, or other suitable packing material, is fitted to the interior of the housing cavity beyond the end of the spacer pilot 74 to seal the opening around the tubular sleeve surrounding the bellows.

The armature 6 is pivotally supported by the motor at the pivot center 58.

In order to prevent the flow of fluid from the hydraulic valve to the motor, a tubular bellows support sleeve 21 is fitted through an opening in the spacer 72 and a connecting cavity in the upper end of the housing 1, the tubular support sleeve having a flange 77 integral with the lower end thereof, and projecting inward therefrom, the lower convolution 78 of the fluted bellows 22 made of a thin sheet of copper or a similar material, being fixedly attached to the inner end of the flange 77 of the tubular sleeve 21 in order to fixedly attach the lower end of the bellows to the tubular sleeve 21.

A thin substantially circular upper plate 80 is fixedly attached to the cylindrical flapper 5 adjacent the flapper end of the motor armature 6, the upper convolution 78–a of the bellows being wrapped around and attached to the outer circumference of the upper plate 80 attached to the flapper by soldering or other suitable attaching means, as shown in FIGURES 1 and 3.

The upper plate 80 which connects the upper convolution of the bellows to the flapper 5 enables the flapper to be moved from the central position shown by dot-dash lines, FIGURE 1, to the right-hand angular position shown in FIGURE 1, and the left-hand angular position shown in FIGURE 2, the convolutions of the bellows taking up the angular movement of the flapper about the pivot center 58 of the armature, and at the same time preventing the flow of fluid from the valve to the motor.

Adjacent the transfer magnets, a pair of substantially U-shaped permanent magnets are attached to the two sides of the transfer magnets, the permanent magnets being attached to the transfer magnets by screws or other suitable attaching means.

A cap 81 of hollow cylindrical contour is fitted to the outer circumference of the spacer 72, the hollow cylindrical upper portion of the cap enclosing the motor. A flange 82 integral with the inner circumferential surface of the cap abuts the upper end of the spacer 72.

When a differential current is sent through the upper coil 15 of the motor, a magnetic flux is set up in the armature, the polarity of the armature flux being opposite that of one pair of diagonally opposite poles of the transfer magnet, thus causing the armature 6 with the flapper 5 attached thereto to be moved from the neutral position shown by dot-dash lines, FIGURE 1, to the right-hand position shown in FIGURE 1, about the central pivot 58, thereby causing the valve spool to move to the right-hand position shown in FIGURE 1, and initiating the flow of fluid under pressure through the left-hand passage 13 through the housing in the manner hereinbefore described.

When a differential current is sent through the lower coil 16 of the motor, a magnetic flux of opposite polarity to that shown in FIGURE 1 is set up in the armature, the polarity of the armature poles being opposite that of the other pair of diagonally opposite poles of the transfer magnets located on opposite sides thereof, thus causing the portion of the armature extending toward the valve from the pivot center thereof, and the flapper 5 attached thereto to be moved angularly leftward from the neutral position shown by dot-dash lines, FIGURE 1, until the flapper head 10 and the flapper attached to the armature are moved to the left-hand position shown in FIGURE 2. This uncovers the left-hand metering opening 7 of the spool 4 and causes the spool to be moved to the left-hand position shown in FIGURE 2, in the manner hereinbefore described. This allows fluid under pressure to flow through the right-hand passage 14 through the housing, to the right-hand or pressure side 150 of the actuator cylinder shown schematically in FIGURE 15, in the manner hereinbefore described.

In place of the tubular sleeve 21 and the bellows 22 fitted thereto, shown in FIGURES 1 and 3, a thin flat diaphragm, or flexure member attached to the flapper by a cylindrical sleeve integral with or attached to the flexure member, may be provided to seal the opening around the flapper and prevent the passage of fluid from the hydraulic valve mechanism in the housing 1 to the motor, or any other suitable type of fluid seal mechanism which permits the angular movement of the flapper through the angular range shown in FIGURES 1 and 3, while still maintaining an accurate seal between the valve housing and the motor may be substituted therefor. In all other respects, the hydraulic valve mechanism, the flapper construction and the torque motor controlling the angular movement of the flapper would remain substantially as shown in FIGURES 1, 2 and 3 and hereinbefore described.

In this manner, an accurate control of the flow of fluid under pressure to the actuator cylinder in either direction is available at all times, the relation of the flow of the differential current through the coils of the motor, controlling the angular movement of the flapper, and the corresponding longitudinal movement of the spool, which selectively controls the flow of fluid under pressure through the passages 13 and 14 through the housing 1, and therefore the direction of movement of the piston in the remotely mounted actuator cylinder.

FIGURES 7 and 8 show a modification of the valve construction shown in FIGURES 1, 2 and 3, the housing 1 and the cylindrical cavities therethrough and the spool support sleeves fitted thereto being substantially the same as those shown in FIGURES 1, 2 and 3 and hereinbefore described.

The passages 12, 13, 14 and 25 through the housing are substantially the same as those shown in FIGURES 2 and 4 and hereinbefore described.

A substantially cylindrical spool 84 similar to that shown in FIGURE 2, is fitted to the cylindrical opening in the end sleeve sections 24, 24–a and the central sleeve section 85, the spool having a series of cylindrical lands 86, 86–a around the outer circumference thereof in the same manner as the spool shown in FIGURE 2.

The body 87 of the spool is of a diameter smaller than the external diameter of the spool lands, the body of the spool having an open slot 88 of rectangular cross-section, and arcuate bottom contour, as shown in FIGURE 8, through the central portion thereof, one face 89 of the slot being considerably closer to the spool centerline than the opposite face thereof.

The auxiliary cylindrical cavity 3 through the housing, and the tubular filter 35 fitted thereto are substantially the same as those shown in FIGURE 2, the filter being supported in the same manner.

The passages through the wall 40 between the auxiliary cavity and the central cavity through the housing 1 are substantially the same as those shown in FIGURE 2 and hereinbefore described.

When the spool is in its neutral, or closed position shown in FIGURE 8, fluid is fed from the upper pressure passage 12 through the housing to the annular space 3–a surrounding the tubular filter, to the end annular areas, 33, 33–a surrounding the sleeve body sections in the same manner as that shown in FIGURES 1, 2 and 3 and hereinbefore described.

When the spool 84 is moved to the left, to the position shown by dot-dash lines, FIGURE 8, the right-hand center land 86–a of the spool partially uncovers the port 28–a through the body of the sleeve section, thereby allowing fluid under pressure, which enters the end annular area 33–a around the sleeve body section, the fluid coming through the openings 41–a and 29–a through the housing separator wall and the sleeve body section respectively, as shown in FIGURE 2, in the manner hereinbefore described, to pass through the port 28–a through the body of the sleeve section, to the intermediate annular area 34–a surrounding the body of the sleeve section, whence it is discharged to the pressure side 150 of the actuator cylinder through the right-hand passage 14, through the housing in the same manner as that shown in FIGURES 2 and 15, and hereinbefore described.

The fluid from the interior of the tubular filter 35 passes through the metering passages 38, 38–a through the plug pilots, through the slotted passages 45, 48 and 45–a, 48a to a pressure area 47, 47–a at each end of the spool in the manner shown in FIGURE 2 and hereinbefore described.

The cylindrical pressure areas 47 and 47–a at both ends of the spool are therefore filled with fluid under substantially equal pressures at both ends in the manner shown in FIGURE 2, the fluid pressures in the pressure areas at the ends of the spool normally maintaining the spool in a central static position, shown in FIGURE 8, when the metering openings 90, 91, which are angularly positioned relative to the face 89 of the slot through the spool, as shown in FIGURE 7, are covered by the head of the flapper. The metering openings passing through the face 89 of the slot through the spool, which are substantially equidistant from the cross centerline of the spool, as shown in FIGURE 8, are closed by the two seal faces 92, 93 of the head of the flapper 94, the seal faces being separated by a central slot through the head of the flapper in a manner similar to the construction shown in FIGURE 2, the detailed operation thereof being hereinafter described in greater detail.

As shown in FIGURES 7, 8 and 10, the spool has a pair of small angularly positioned metering openings 90, 91 equidistant from the cross-centerline of the spool therein, each of the metering openings being connected by an angularly positioned intermediate passage 95 which leads from a longitudinal circular passage 96, located adjacent the longitudinal axis of the spool, the opposite end of the longitudinal passage 96 leading directly into the pressure areas 47, 47–a at the corresponding end of the spool in substantially the manner shown in FIGURE 2 and hereinbefore described.

As shown in FIGURES 7 and 8, the armature 6 mounted between the poles of the transfer magnets 17, 18 is substantially the same as that shown in FIGURES 1 and 3 and hereinbefore described, the armature being pivoted about approximately the pivot centerline 58 thereof in the same manner.

The flapper 94 is attached to the valve end of the armature 6 in the same manner as that shown in FIGURE 3, or pinned thereto, or fixedly attached thereto by other suitable attaching means, the head of the flapper 94 adjoining one face 89 of the rectangular slot 88 through the center of the spool body, in the manner shown in FIGURE 7, the flapper head having a U-shaped slot therethrough which divides it into two seal areas 92, 93 which abut one face 89 of the slot through the spool body, and are located on opposite sides of the longitudinal axis of the flapper head.

When the flapper is located in its neutral position shown in FIGURE 8, the two seal areas 92, 93 of the head of the flapper cover the two metering openings 90, 91 of the spool, thereby sealing the metering openings in substantially the same manner as those shown in FIGURES 1 and 2.

When the head of the flapper 94 is moved angularly to the left to the position shown in FIGURE 10, the right-hand edge of the seal area 92 adjacent the central slot through the flapper head uncovers at least a portion of the left-hand metering opening 90 through the spool, thereby allowing fluid under pressure to escape from the left-hand pressure area 47 at the left-hand end of the spool and pass through the left-hand longitudinal passage 96 through the spool, through the left-hand metering opening 90, to the central annular area 97 around the central portion of the body of the spool, whence it flows through a cutout through the sleeve body to the outer annular area 85–a surrounding the central section 85 of the sleeve, between the central lands thereof, the outer central annular area being connected to the lower drain passage 25 through the housing, which is directly connected to the central outer annular area 85–a in the same manner as that shown in FIGURE 3 the fluid passing from the passage 25 to the drain line of the system to which it is connected, in the manner shown in FIGURE 2 and hereinbefore described.

This reduction in pressure in the left-hand pressure area caused by draining fluid out of the left-hand metering opening through the spool, forces the spool longitudinally leftward to substantially the position shown in FIGURE 10 and in dot-dash lines, FIGURE 8.

When the spool is in this position, which is substantially the same as that shown in FIGURE 2, the right-hand center land 86–a of the spool partially uncovers the port 28–a through the sleeve body, thereby allowing pressure fluid, which passes through the port through the sleeve body to the right-hand annular area 43–a around the spool body, in the manner shown in FIGURE 2 and hereinbefore described, to pass through the port 28–a through the side sleeve section, to the intermediate outer annular area 34–a surrounding the body of the sleeve section, whence it passes to the pressure side 150 of the actuator cylinder through the right-hand passage 14 through the housing as shown schematically in FIGURE 15, in the same manner as that shown in FIGURES 2 and 15, and hereinbefore described.

At the same time, fluid from the drain side 152 of the actuator cylinder passes through the left-hand passage 13 through the housing, to which it is connected, from which it passes through the left-hand passage 28 through the sleeve, through which it enters the central annular area 97, surrounding the spool body, to the central outer annular area 85–a surrounding the central section 85 of the sleeve, which is directly connected thereto, in the same manner as the passages shown in FIGURE 3, the fluid from the outer central annular area 85–a being discharged through the drain passage 25 through the housing in the manner shown in FIGURE 15 and hereinbefore described.

The spool movement continues until the seal areas 92 and 93 of the head of the flapper again cover the two metering openings 90 and 91 through the spool, thus shutting off the flow of fluid through the left-hand metering opening 90, thereby allowing the pressure in the left and right-hand pressure areas 47 and 47–a at the ends of the spool to be equalized, and in that manner stabilizing the position of the spool until the flapper is again moved by the angular movement of the torque motor armature 6.

When the flapper is moved to the right, from the neutral position, shown in FIGURE 8, substantially the same conditions arise, the spool moving to the right to a position corresponding with that shown in FIGURE 1, until the seal areas of the flapper head again cover the metering openings 90, 91 and the fluid pressures in the pressure areas 47 and 47–a at both ends of the spool are substantially equalized in the manner shown in FIGURE 1 and hereinbefore described.

While the spool is in this position, right-hand, FIGURE 1, the pressure fluid from the annular space 3–a surrounding the tubular filter passes through the left-hand annular area 43 surrounding the spool body and out through the left-hand passage 13 through the housing, to the left-hand end 152 of the actuator cylinder of the system in the same manner as that shown in FIGURES 1, 2 and 15 and hereinbefore described.

The fluid in the central annular area 97 around the body of the spool passes through the port 28–a through the sleeve body to the outer central annular area 85–a, which is directly connected to the central annular area 97 surrounding the spool, thence through the lower drain passage 25 through the housing, to the drain line of the system in the manner hereinbefore described.

At the same time fluid from the drain side 150 of the actuator cylinder passes through the right-hand passage 14 through the housing, which under these conditions is connected to the drain side of the actuator cylinder, as shown schematically in FIGURE 15. From the right-hand passage 14 through the housing, it passes through the right-hand port 28–a through the sleeve, through which it passes through the central annular area 97 surrounding the spool and enters the outer central annular area 85–a surrounding the central sleeve section 85, whence it is discharged through the drain passage 25 through the housing, in the same manner as that shown in FIGURES 1, 2 and 15 and hereinbefore described.

The operation of the valve mechanism, the flow of fluid therethrough, and the relation between the valve mechanism and the remotely mounted actuator cylinder is substantially the same as that shown schematically in FIGURE 15.

When the spool is moved leftward to the position shown by dot-dash lines, FIGURE 8, the fluid in the annular area 43–a which is received from the central housing passage 12, passes through the right-hand sleeve port 28–a, to the outer annular area 34–a surrounding the sleeve, through the right-hand passage 14, through the housing, from which it enters the right-hand area 150 of the actuator cylinder, shown in FIGURE 15, the piston 151 of the actuator cylinder functioning in substantially the same manner as that shown in FIGURE 15 and hereinbefore described.

The fluid discharged from the left-hand area 152 of the actuator cylinder by the leftward movement of the piston 151 passes through the left-hand passage 13 through the housing, through the sleeve port 28, into the central annular area 97 surrounding the spool, thence through the outer central annular area 85–a surrounding the central section of the sleeve, from which it passes through the drain passage 25 through the housing, as shown in FIGURE 15, to a receiver or other storage means in substantially the same manner as that shown in FIGURES 2 and 15, and hereinbefore described.

When the spool is moved to the right, in the manner hereinbefore described, the flow of fluid from the valve to the actuator cylinder, and from the discharge side of the actuator cylinder back to the valve is substantially the same as that shown in FIGURE 15, except that the flow of fluid under pressure is through the left-hand sleeve port 28, and the left-hand passage 13 through the housing, into the left-hand area 152 of the actuator cylinder, the fluid discharged from the right-hand area 150 of the actuator cylinder being returned to the valve mechanism through the right-hand passage 14 through the housing, thence through the right-hand port 28–a through the sleeve, through the central annular area 97 surrounding the spool, and the outer annular area 85–a surrounding the sleeve body, from which it is discharged through the drain passage 25 through the housing in the same manner as that shown in FIGURE 15 and hereinbefore described.

The torque motor shown in FIGURES 7 and 8 is substantially the same as that shown in FIGURES 1 and 3, and functions in substantially the same manner.

The sealing means provided between the torque motor and the valve, in the construction shown in FIGURES 7 and 8, including the bellows 22 and the method of attaching the bellows 22 to the central bellows support sleeve 21 and the flapper 94, are substantially the same as that shown in FIGURES 1 and 3 and hereinbefore described.

The permanent magnets, the transfer magnets 17, 18 and the coils 15, 16 used in conjunction with the torque motor shown in FIGURES 7 and 8 are substantially the same as those shown in FIGURES 1 and 3.

The armature 6 of the torque motor and the flapper 94 attached thereto are moved leftward to the position shown by dot-dash lines, FIGURE 8, or rightward under control of the differential current sent through the coils 15 and 16, in the manner hereinbefore described relative to the torque motor shown in FIGURES 1 and 3.

The seal mechanism between the torque motor and the valve housing may be replaced by other suitable seal means to prevent fluid from the valve from entering the torque motor area.

In all other respects, the movement of the flapper and that of the spool in either direction and consequently the control of a piston 151 fitted to an externally mounted actuator cylinder, such as that shown schematically in FIGURE 15, are effected in substantially the same manner as in the construction shown in FIGURES 1, 2, 3 and 15, and hereinbefore described.

FIGURES 11, 12 and 13 show another modification of the valve construction shown in FIGURES 1, 2 and 3.

This unit is mounted in a valve housing 105 having a central cylindrical cavity 106 therethrough, into which a tubular spool support sleeve 107 is fitted in a manner similar to that shown in FIGURES 1 and 2.

A cylindrical spool 108 having a plurality of cylindrical lands 109, 110 integral therewith, is slidably fitted to an opening in the center of the sleeve in the same manner as that shown in FIGURE 2.

The spool has a central insert fitted thereto, the insert consisting of a cylindrical body 112 fitted to an opening in the spool, substantially perpendicularly to the longitudinal axis thereof, and a head 114 projecting beyond the spool body, the outer flat face of the head of the insert being fitted through an opening in the sleeve adjacent the outer circumference thereof, as shown in FIGURE 12.

The head of the insert and the body thereof, have a pair of cylindrical cavities 115, 116 therein, the cylindrical cavities extending through the outer surface of the insert head substantially perpendicularly to the longitudinal axis of the spool, as shown in FIGURE 14. The open end of the cavities 115 and 116 are located on opposite sides of the cross centerline of the spool, one edge of each opening 117, 118 extending through the face of the spool insert, which is respectively connected to each of the cavities 115 and 116, being located substantially on the cross centerline 119 of the spool, the openings connected to the cavities being located on opposite sides of the longitudinal axis of the spool, each of the openings being located a short distance therefrom.

As shown in FIGURE 11, each of the cavities 115, 116 through the body of the spool insert is connected by a longitudinal passage 120, 121 through the body of the spool, to the end of the spool, opposite the side thereof on which the opening 117 or 118 directly connected to the passage is located, thus the opening 117 through the head of the insert located on the left-hand side of the cross centerline of the spool is connected to the longitudinal passage 120 located on the right-hand side of the spool, the passages 120 and 121 opening into cylindrical pressure areas 124 at both ends of the spool, beyond the end lands 109 thereof, for reasons which will hereinafter be described in greater detail.

As shown in FIGURES 11 and 12, an armature 126 which is pivotally supported by a torsion member 127 mounted at the center of a torque motor shown in FIGURES 11 and 12, is mounted substantially on the cross-centerline of the spool 108 when the armature is in its neutral position shown in FIGURE 11, the armature consisting of a body of rectangular cross-section, the sides of which are tapered inward toward the ends thereof, in one plane as shown in FIGURE 11, with a narrow flapper 128 of rectangular cross-section integral with and extending beyond the valve end of the armature, the extreme end of the flapper 128, located adjacent the flat outer surface of the head 114 of the insert clearing the surface of the insert by a very small amount, which is merely sufficient to enable the flapper to be angularly moved through a small angle about the torsion pivot member thereof, between one extreme angular position shown by dot-dash lines, FIGURE 11, to the opposite angular position shown by dash lines, FIGURE 11.

In its neutral position, the thickness of the flapper is such that it covers the two metering openings 117, 118, which are connected to the cross-passages through the head of the spool insert.

When the spool is in its neutral position shown in FIGURE 13, fluid under pressure, which may be substantially equal to the line pressure, or sharply reduced therefrom, is maintained in the two end pressure areas 124, which are similar to the pressure areas 47, 47–a at the ends of the spool in FIGURE 2, the fluid being supplied through passages through the housing which are not shown.

When the flapper 128 is moved to the right, to the position shown by dash lines, FIGURE 11, in a manner hereinafter described in greater detail, the rectangular area at the end of the flapper 128 partially, or completely uncovers the left-hand metering opening 117, which is in direct communication with the cavity 115, which is directly connected to the right-hand longitudinal passage 120 through the spool. This allows fluid under pressure from the right-hand pressure area at the end of the spool to pass through the longitudinal passage 120 through the spool and through the left-hand metering opening 117 in the head of the spool insert.

This sharply reduces the pressure in the right-hand pressure area at the end of the spool, and as the pressure in the left-hand pressure area 124 is maintained at a substantially constant level, the pressure differential between the left and right-hand pressure areas 124 forces the spool rightward to the position shown by dash lines, FIGURE 13, until the left and right-hand metering openings are again covered by the rectangular end of the flapper, thus allowing the pressure in the left and right-hand pressure areas to be stabilized and equalized, and retaining the spool in the right-hand position shown in FIGURE 13.

In this position, the left-hand inner land 110 of the spool partially uncovers a port 130 through the wall of the sleeve, which is connected through a passage 131 through the housing with one side 152 of a remotely positioned actuator cylinder similar to that shown schematically in FIGURE 15.

Fluid under line pressure is fed from an external source through an inlet passage 113 through the housing, through a longitudinal housing passage 134 connected therewith, thence through a left-hand cross passage 135 shown at the left-hand side, FIGURE 13, through the housing, through an opening 136 through the wall of the sleeve body, through the left-hand annular area 137 surrounding the body of the spool, and thence through the partially uncovered port 130 through the sleeve body, which is connected to the left-hand side 152 of the actuator cylinder of the system in the manner similar to that shown schematically in FIGURE 15 and hereinbefore described.

When the spool is in this position, right-hand, FIGURE 13, the fluid which is collected from the metering openings 117 and 118 in the central annular area 138 around the body of the spool, passes through the outer central annular area 106–a, surrounding the sleeve 107, from which it passes through a drain line passage through the housing, which is similar to the lower drain passage 25 shown in FIGURES 2 and 15, which is connected to the drain line of the system in the same manner as that shown in FIGURES 1, 2 and 15 and hereinbefore described.

At the same time, fluid from the drain side 150 of the externally mounted actuator cylinder passes through the right-hand passage 139 through the housing body in a manner similar to that shown schematically in FIGURE 15, the fluid passing through the right-hand port 130–a through the sleeve, which under these conditions are connected to the drain side 150 of the actuator cylinder, to the central annular area 138 surrounding the spool, which is connected by a sleeve port (not shown) to the outer central annular area 106–a, surrounding the central portion of the sleeve 107, the outer central annular area being connected to a drain passage, similar to the passage 25 through the housing shown in FIGURES 2 and 15, which is connected to the drain line of the system in the same manner as that shown in FIGURES 2 and 15 hereinbefore described.

When the flapper is moved to the left to the angular position shown by dot-dash lines, FIGURE 11, it uncovers the right-hand metering opening, thereby causing a pressure differential between the left and right-hand pressure areas 124, thus causing the spool to move leftward to the position shown by dot-dash lines, FIGURES 11 and 13.

In this position, left-hand, FIGURE 13, the right-hand central land 110-a of the spool partially uncovers the right-hand port 130-a through the sleeve body and allows fluid from the annular area 137-a surrounding the right-hand portion of the body of the spool to pass through the port 130-a, thence through the right-hand passage 139 through the housing, which under these conditions is connected to the right-hand side 150 of the actuator cylinder of the system shown in FIGURE 15, which is opposite that to which the left-hand passage 131 shown in FIGURE 13 is connected.

While the spool is in this position, the fluid discharged from the metering openings 117 and 118, which accumulates in the central annular area 138 around the spool body, passes through a central passage (not shown) through the sleeve wall, through the outer central annular area 106-a surrounding the sleeve 107, from which it passes through a drain line passage through the housing, which is similar to the passage 25 shown in FIGURES 2 and 15, and hereinbefore described.

At the same time, fluid from the drain side 152 of the externally mounted actuator cylinder passes through the left-hand passage 131 through the housing body, through the left-hand port 130 through the sleeve, which under these conditions are connected to the drain side 152 of the actuator cylinder in a manner similar to that shown schematically in FIGURE 15 and hereinbefore described, the fluid passing to the central annular area 138 surrounding the spool, which is connected by a sleeve port (not shown) to the outer central annular area 106-a surrounding the sleeve, as hereinbefore described in conjunction with the right-hand movement of the spool, the central outer annular area 106-a being connected to a drain passage similar to the lower passage 25 through the housing, shown in FIGURES 2 and 15, which is connected to the drain line of the system as hereinbefore described.

The flow of fluid through the ports and passages through the valve housing and the relation between the valve mechanism shown in FIGURES 12 and 13 and the remotely mounted actuator cylinder, are similar to those shown schematically in FIGURE 15 and hereinbefore described.

When the spool is moved leftward to the position shown by dot-dash lines, FIGURE 13, the fluid in the annular area 137-a which is received from a passage corresponding to the central housing passage 12 shown in FIGURE 15, passes through the right-hand sleeve port 130-a, thence through the passage 139 through the housing, as shown in FIGURE 13, from which it enters the right-hand area 150 of the actuator cylinder shown in FIGURE 15, the piston 151 of the actuator cylinder functioning in the same manner as that hereinbefore described.

The fluid discharged from the left-hand area 152 of the actuator cylinder by the leftward movement of the piston 151 passes through the left-hand passage 131 through the housing, through the sleeve port 130, into the central annular area 138 surrounding the spool, thence through the outer central annular area 106-a surrounding the central portion of the sleeve, from which it passes through a drain passage corresponding to the drain passage 25 through the housing, which is similar to that shown in FIGURES 2 and 15, from which it is discharged to a receiver or other storage means in substantially the same manner as that shown in FIGURES 2 and 15 and hereinbefore described.

When the spool is moved to the right, the flow of the fluid from the valve to the actuator cylinder, and from the discharge side of the actuator cylinder back to the valve is substantially the same as that shown in FIGURE 15, and hereinbefore described, except that the flow of pressure fluid to the actuator cylinder is into the left-hand area 152 of the cylinder, thereby forcing the piston rightward from the position shown in FIGURE 15, the fluid discharged from the right-hand area 150 of the cylinder being returned to the valve mechanism through the right-hand passage 139 through the housing, in substantially the same manner as that hereinbefore described with regard to the leftward movement of the spool.

The torque motor shown in FIGURES 11 and 12, which is similar to that shown in FIGURES 1 and 3, comprises a pair of U-shaped transfer magnets 142, 143 mounted on opposite sides of the armature, with a pair of permanent magnets 144 located at the sides of the poles of the transfer magnets adjacent the upper and lower edges of the coils, the permanent magnets being so positioned that the poles of each transfer magnet located on each side of the armature 126 are of the same polarity, as shown in FIGURE 11.

A pair of coils 146, 147 is fitted around the armature, between the legs or poles of the transfer magnets, as shown in FIGURE 11.

The torsion member 127 which pivotally supports the armature 126 is located between the upper and lower coils 146, 147 of the motor, as shown in FIGURE 12.

The operation of the torque motor is substantially the same as that shown in FIGURES 1 and 3 and hereinbefore described.

When a differential current is sent through the upper coil 146 of the motor, the flapper end of the armature is moved from the neutral position shown in FIGURE 11, to the left-hand position shown by dot-dash lines, FIGURE 11, thereby moving the flapper 128 to the left-hand position and actuating the spool in the manner hereinbefore described.

When the differential current through the lower coil 147 is stronger, the flapper end of the armature is moved to the right-hand position, shown by dash lines, FIGURE 11, thereby moving the flapper 128 to the right, uncovering the left-hand metering opening 117 through the spool insert head 114, and controlling the movement of the spool in the manner hereinbefore described.

The torque motor shown in FIGURES 1, 3 and 4 and the modified torque motor shown in FIGURES 11 and 12, can be replaced by another type of motor, or by other suitable means for angularly moving the flapper from the neutral position to the left or right-hand operating position shown in the various views of the drawings, as the result of an electrical signal transmitted from an external source, the signal being amplified to the extent necessary to provide the necessary energy to move the flapper.

The bellows construction shown in FIGURES 1 and 3, for separating the motor structure from the valve, in order to prevent the flow of fluid from the valve to the motor may be replaced by other suitable seal means for accomplishing the same purpose.

The armature of the motor shown in FIGURES 1, 3 and 4 may be supported by a torsion pivot member, such as that shown in FIGURES 11 and 12, or other suitable pivot means may be substituted therefor, the operation of the motor remaining substantially as described.

The metering openings through the spool may be located on one side of the spool, as shown in FIGURES 1, 2 and 3, the head of the flapper being located at the same side of the spool, or the openings through the spool may be located on opposite sides of the spool, the head of the flapper straddling the central section of the spool in such a manner as to alternately uncover the metering openings through one side, or the opposite side of the spool, the essential features of the construction and the operation of the other parts of the apparatus remaining substantially the same as those shown in FIGURES 1, 2 and 3 and hereinbefore described.

The size of the metering openings shown in FIGURES 1 and 3 and those shown in FIGURES 7 and 8, while normally about .015 to .020 diameter may be increased or decreased depending upon the size of the spool, the spool movement required, and the rate of fluid flow through the metering openings required to longitudinally move the spool through the distance required within the time limitations established, as well as the fluid pressure in the entire system, or in the event of reduced pressure through the metering openings, the pressure of the fluid fed through the metering openings, the flapper construction being proportionately altered, and the other phases of the apparatus remaining essentially the same.

The filter shown in FIGURES 1, 2 and 3 may be located in the relation shown in FIGURES 1 and 3, or relocated in other suitable relation to the other parts of the valve mechanism, provision being made for filtering the fluid fed through the metering openings formed in the body of the spool, or another suitable type of filter, or filters may be substituted therefor, depending upon the accuracy with which the spool is fitted to the opening in the sleeve, the type and viscosity of the oil or other fluid used in the system, the range of operating temperatures normally encountered, the atmospheric conditions and environmental conditions under which the unit is operated, the other aspects of the construction and means of operation of the unit remaining substantially the same.

The flapper 128 may be integral with the armature as shown in FIGURES 11 and 12, or attached thereto in the manner shown in FIGURE 3, or by other suitable attaching means, the essentials of the construction and the method of operation of the armature and the flapper remaining substantially the same.

A seal means such as that shown in FIGURES 1 and 3 may be incorporated in the servo-valve and motor combination shown in FIGURES 11 and 12, the construction of the valve and the motor used in conjunction therewith remaining substantially as shown, except for the fact that the valve and the motor would be moved further apart in order to provide space for the seal means, the armature and/or flapper being correspondingly lengthened.

It will be apparent to those skilled in the art that the present invention is not limited to the specific details described above and shown in the drawings, and that the various modifications are possible in carrying out the features of the invention and the operation, actuation and method of mounting and utilization thereof, without-departing from the spirit and scope of the appended claims.

What is claimed is:

1. A valve actuating mechanism for a hydraulic servo valve, comprising a housing having a cylindrical cavity therein, defined by a cylindrical wall, a substantially cylindrical mating spool having a plurality of axially spaced integral cylindrical lands to define annular regions therebetween, the spool slidably fitting in the cavity, and the cavity wall having a plurality of ports therethrough corresponding in location and longitudinal length to the mating spool lands, the housing also having a plurality of passages therethrough in communication with the cavity wall ports, and the spool having a pair of metering openings therein; said metering openings being located between a pair of lands, the axes of said metering openings being located in a plane through the longitudinal axis of the spool, and a plurality of longitudinal passages through the spool to connect each metering opening with the corresponding cylindrical region at the end of the spool; an angularly movable flapper mounted adjacent the portion of the spool through which the metering openings pass, the flapper being angularly movable in a plane substantially perpendicular to the plane through the axes of the metering openings, the flapper having an integral head operative to engage the area of the spool through which the metering openings pass to normally cover said metering openings, means operative to selectively angularly move the flapper to a position in which one of the metering openings is uncovered, fluid passageways operative to supply fluid under pressure to the cylindrical regions at both ends of the spool and the mating annular areas between pairs of spool lands, whereby the spool may be longitudinally moved along the cylindrical cavity when one of the metering openings is uncovered, the uncovering of the cavity wall ports by the spool lands permitting fluid under pressure to selectively flow through connecting passages through the housing, the flapper control means being an electrically operated actuating mechanism pivotally supporting the flapper, said flapper control means being operative to selectively angularly move the flapper into a position in which the head thereof uncovers one of the metering openings in the spool to create a pressure differential between the cylindrical regions at both ends of the spool, thereby causing the spool to move in a longitudinal direction relative to the cylindrical cavity, the direction of movement of the spool being co-ordinated with the position of the uncovered metering opening relative to the flapper axis, the longitudinal spool movement continuing until the metering openings through the spool are again covered by the flapper head, the fluid pressures in the cylindrical areas at both ends of the spool being equalized, a pair of fixed longitudinal metering passages located substantially parallel to the spool axis, each of said fixed passages being located near one of the cylindrical regions at the ends of the spool, and a plurality of passageways operatively connecting the fixed longitudinal passageways, to the respective cylindrical regions at the ends of the spool to susbtantially equalize the fluid pressures in the cylindrical regions at both ends of the spool when the metering openings in the spool are covered by the flapper head.

2. A valve actuating mechanism for a hydraulic servo valve comprising a housing having a cylindrical cavity therein, defined by a cylindrical wall, a substantially cylindrical mating spool having a plurality of axially spaced integral cylindrical lands to define annular regions therebetween, the spool slidably fitting in the cavity, and the cavity wall having a plurality of ports therethrough corresponding in location and longitudinal length to the mating spool lands, the housing also having a plurality of passages therethrough in communication with the cavity wall ports, and the spool having a pair of metering openings therein; said metering openings being located between a pair of lands, the axes of said metering openings being located in a plane passing through the longitudinal axis of the spool, and a plurality of longitudinal passages through the spool to connect each metering opening with the corresponding cylindrical region at the end of the spool, the spool having a substantially flat face thereon in the area through which the metering openings pass, an angularly movable flapper mounted adjacent the portion of the spool through which the metering openings pass, the flapper having an integral head, one face of which is operative to slidably engage the flat face of the spool through which the metering openings pass to normally cover the metering openings, the flapper being angularly movable in a plane susbtantially perpendicular to the plane through the axes of the metering openings, remotely controllable means operative to selectively angularly move the flapper into a position in which the head of the flapper uncovers one of the metering openings in the spool, thereby permitting fluid from the corresponding cylindrical region at one end of the spool to flow through the uncovered metering opening, thus reducing the fluid pressure in the cylindrical region at the corresponding end of the spool relative to that at the opposite end thereof, the fluid presure differential between the cylindrical regions at both ends of the spool being operative to longitudinally move the spool in a direction corresponding to the location of the uncovered metering opening, relative to the flapper longitudinal axis.

3. A valve actuating mechanism for a hydraulic servo valve comprising a housing having a cylindrical wall defining a cylindrical chamber, a tubular sleeve fitted to the cylindrical chamber, a substantially cylindrical control spool slidably fitted to the sleeve and of such length and so positioned as to leave some free space at each end of the sleeve, and said control spool being so shaped as to embody two axially spaced annular lands adjacent each end thereof, all of said lands being of equal diameter to slide fit in the sleeve, the body of the spool in the space between two of said lands having two axially spaced metering openings through the body wall, the spool having a slot of rectangular cross-section through one side thereof, the slot being substantially parallel to the longitudinal spool axis, the metering openings in the spool extending into one wall thereof adjacent one face of the slot, the sleeve having a plurality of ports through the circumferential wall thereof, corresponding in location and longitudinal length to the metering spool lands, and a plurality of passageways through the housing in communication with the sleeve ports, the metering openings in the spool being located on opposite sides of the cross centerline of the spool, and a plurality of longitudinal passages through the spool body to connect each metering opening with the corresponding cylindrical region at one end of the spool, a movable flapper mounted adjacent the portion of the spool in which the metering openings in the spool are located, said flapper being electrically controllable, means surrounding the flapper adapted to selectively move the flapper to a position in which one of the metering openings is uncovered, fluid passageways operative to supply fluid under pressure to the cylindrical regions at both ends of the spool and the annular regions around the spool between the lands thereof, the spool being operative to be longitudinally moved along the sleeve when one of the metering openings is uncovered, the uncovering of portions of the sleeve ports by the spool lands being operative to allow fluid under pressure to selectively flow through connecting passages through the housing.

4. A valve actuating mechanism for a hydraulic servo valve comprising a housing having a cylindrical wall defining a cylindrical chamber, a tubular sleeve fitted to the cylindrical chamber, a substantially cylindrical control spool slidably fitted to the sleeve and of such length and so positioned as to leave some free space at each end of the spool, and said control spool being so shaped as to embody two axially spaced annular lands adjacent each end thereof, all of said lands being of equal diameter to slide fit in the sleeve, the body of the spool in the space between two of said lands, having two axially spaced metering openings through the body wall, the spool having a slot of substantially rectangular cross-section through one side thereof, the slot being substantially parallel to the longitudinal spool axis, the metering openings in the spool extending into one wall thereof adjacent one face of the slot, the sleeve having a plurality of ports through the circumferential wall thereof, corresponding in location and longitudinal length to the metering spool lands, and a plurality of passageways through the housing in communication with the sleeve ports, the metering openings in the spool being located on opposite sides of the cross centerline of the spool, and a plurality of longitudinal passages through the spool body to connect each metering opening with the corresponding cylindrical region at one end of the spool, the flapper having an integral head, a portion of the head of the flapper fitting into the slot in the spool adjacent the face of the slot through which the metering openings pass, the head of the flapper having a longitudinal open slot through the end thereof to separate the head into two seal areas, each of said seal areas being adapted to cover one of the metering openings in the spool, the flapper control means being operative to selectively angularly move the flapper into a position in which one of the seal areas of the head thereof uncovers the adjacent metering opening in the spool, thereby permitting fluid from the corresponding cylindrical region at one end of the spool to flow through the uncovered metering opening, thus reducing the fluid pressure at the corresponding cylindrical region at one end of the spool relative to that at the opposite end thereof, the fluid pressure differential between the cylindrical regions at the two ends of the spool being operative to longitudinally move the spool in a direction corresponding to the location of the uncovered metering opening relative to the flapper longitudinal axis.

5. A valve actuating mechanism for a hydraulic servo valve comprising a housing having a cylindrical cavity therein, defined by a cylindrical wall, a substantially cylindrical mating spool having a plurality of axially spaced integral cylindrical lands to define annular regions therebetween, the spool slidably fitting in the cavity, and the cavity wall having a plurality of ports therethrough corresponding in location and longitudinal length to the mating spool lands, the housing also having a plurality of passages therethrough in communication with the cavity wall ports, and the spool having a pair of metering openings therein; said metering openings being located between a pair of lands, and a plurality of longitudinal passages through the spool to connect each metering opening with the corresponding cylindrical region at the end of the spool; a substantially flat surface being formed on the spool in the area through which the metering openings pass, an angularly movable flapper mounted adjacent the portion of the pool through which the metering openings pass, the flapper having an integral head operative to engage the flat surface of the spool through which the metering openings pass for controlling the longitudinal movement of the spool relative to the cylindrical wall of the housing and the ports therethrough, the head of said flapper being operative to simultaneously cover both metering openings in the spool, flapper control means operative to selectively angularly move the flapper to a position in which one of the metering openings is uncovered, fluid passageways operative to supply fluid under pressure to the cylindrical regions at both ends of the spool and the mating annular areas between pairs of spool lands, whereby the spool may be longitudinally moved along the cylindrical cavity when one of the metering openings is uncovered, the uncovering of the cavity wall ports by the spool lands permitting fluid under pressure to selectively flow through connecting passages through the housing.

6. A valve actuating mechanism for a hydraulic servo valve comprising a housing having a cylindrical cavity therein, defined by a cylindrical wall, a substantially cylindrical mating spool having a plurality of axially spaced integral cylindrical lands to define annular regions therebetween, the spool slidably fitting in the cavity, and the cavity wall having a plurality of ports therethrough corresponding in location and longitudinal length to the mating spool lands, the housing also having a plurality of passages therethrough in communication with the cavity wall ports, and the spool having a pair of metering openings therein; said metering openings being located between a pair of lands, and a plurality of longitudinal passages through the spool to connect each metering opening with the corresponding cylindrical region at the end of the spool, an angularly movable flapper mounted adjacent the portion of the spool through which the metering openings pass, the flapper having an integral head, one face of which is operative to slidably engage the flat surface of the spool through which the metering openings pass, to cover said metering openings and selectively uncover one of the metering openings in the spool to generate a pressure differential between the cylindrical regions at both ends of the spool, thereby causing the spool to move in a longitudinal direction relative to the cylindrical wall, the direction of movement of the spool being co-ordinated with the position of the uncovered metering opening relative to the flapper axis, the longitudinal spool movement continuing until the head of the flapper covers the metering openings in the spool, the pressure in the cylindrical regions at the ends of the spool being equalized, flapper control means operative to selectively angularly move the flapper to a position in which one of the metering openings is uncovered, fluid passageways operative to supply fluid under pressure to the cylindrical regions at both ends of the spool and the mating annular areas between pairs of spool lands, whereby the spool may be longitudinally moved along the cylindrical cavity when one of the metering openings is uncovered, the uncovering of the cavity wall ports by the spool lands permitting a fluid under pressure to selectively flow through connecting passages through the housing.

7. A valve actuating mechanism for a hydraulic servo valve, comprising a housing having a cylindrical wall defining a cylindrical chamber, a tubular sleeve fitted to the cylindrical chamber, a substantially cylindrical control spool slidably fitted to the sleeve and of such length and so positioned as to leave some free space at each end of the sleeve, and said control spool being so shaped as to embody two axially spaced annular lands adjacent each end thereof, all of said annular lands being of equal diameter to slide fit in the sleeve, the body of the spool in the space between two of said lands having two axially spaced metering openings through the body wall, the sleeve having a plurality of ports through the circumferential wall thereof, corresponding in location and longitudinal length to the metering spool lands, and a plurality of passageways through the housing in communication with the sleeve ports, the metering openings in the spool being located on opposite sides of the cross centerline of the spool, and a plurality of longitudinal passages through the spool body to connect each metering opening with the corresponding cylindrical region at one end of the spool, the spool having a slot of substantially rectangular cross-section through one side thereof, the slot being substantially parallel to the longitudinal spool axis, the metering openings in the spool extending into one wall thereof adjacent one face of the slot, a movable flapper mounted adjacent the portion of the spool in which the metering openings are located, the flapper having an integral head at one end thereof, a portion of the flapper head in the spool adjacent one face of the slot having a longitudinal open slot through the end thereof to separate the head into two seal areas, each of the seal areas being operative to cover one of the metering openings in the spool, the means adapted to selectively move the flapper to a position in which one of the metering openings is uncovered, being operative to selectively angularly move the flapper into a position in which one of the seal areas of the flapper head uncovers the adjacent metering opening in the spool, thereby permitting fluid from the corresponding cylindrical region at one end of the spool to flow through the uncovered metering opening and reduce the fluid pressure in the corresponding cylindrical region at one end of the spool relative to the opposite end thereof, the fluid pressure differential between the cylindrical regions at the two ends of the spool being operative to longitudinally move the spool in a direction corresponding to the location of the uncovered metering opening in the spool relative to the longitudinal axis of the flapper, the spool movement continuing until the metering openings through the spool are again covered by the flapper head seal areas, the fluid pressures in the cylindrical fluid regions at the ends of the spool being equalized, passageways operative to supply fluid under pressure to the cylindrical regions at both ends of the spool and the annular regions around the spool between the lands thereof, the spool being operative to be longitudinally moved along the sleeve when one of the metering openings is uncovered, the uncovering of portions of the sleeve ports by the spool lands being operative to allow fluid under pressure to selectively flow through connecting passages through the housing.

References Cited in the file of this patent

UNITED STATES PATENTS

| | | |
|---|---|---|
| 2,526,709 | Tait | Oct. 24, 1950 |
| 2,601,207 | Jacques | June 17, 1952 |
| 2,615,466 | Garde | Oct. 28, 1952 |
| 2,635,581 | Karig | Apr. 21, 1953 |
| 2,742,919 | Ray | Apr. 24, 1956 |
| 2,767,689 | Moog | Oct. 23, 1956 |
| 2,824,574 | Place | Feb. 25, 1958 |
| 2,936,783 | Moffatt | May 17, 1960 |

FOREIGN PATENTS

| | | |
|---|---|---|
| 492,292 | Germany | Feb. 22, 1930 |
| 525,878 | Germany | June 4, 1931 |